(12) United States Patent
Häussler

(10) Patent No.: US 11,506,828 B2
(45) Date of Patent: Nov. 22, 2022

(54) LIGHT GUIDE DEVICE AND ILLUMINATION DEVICE HAVING A LIGHT GUIDE DEVICE

(71) Applicant: SEEREAL TECHNOLOGIES S.A., Munsbach (LU)

(72) Inventor: Ralf Häussler, Dresden Sachsen (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 17/271,080

(22) PCT Filed: Aug. 14, 2019

(86) PCT No.: PCT/EP2019/071785
§ 371 (c)(1),
(2) Date: Feb. 24, 2021

(87) PCT Pub. No.: WO2020/038790
PCT Pub. Date: Feb. 27, 2020

(65) Prior Publication Data
US 2021/0318481 A1 Oct. 14, 2021

(30) Foreign Application Priority Data
Aug. 24, 2018 (EP) ...................................... 8190678

(51) Int. Cl.
*F21V 8/00* (2006.01)
*G02B 27/10* (2006.01)

(52) U.S. Cl.
CPC ......... *G02B 6/0028* (2013.01); *G02B 6/0055* (2013.01); *G02B 6/0068* (2013.01); *G02B 27/1006* (2013.01)

(58) Field of Classification Search
CPC .. G02B 6/0068; G02B 6/0055; G02B 6/0038; G02B 6/0028; G02B 27/1006
See application file for complete search history.

(56) References Cited

U.S. PATENT DOCUMENTS 6,169,613 B1 * 1/2001 Amitai ..................... G02B 6/34
359/33
2006/0221448 A1 * 10/2006 Nivon ................ G02B 27/1086
359/566

(Continued)

OTHER PUBLICATIONS

International Search Report, dated Nov. 15, 2019, and Written Opinion issued in International Application No. PCT/EP2019/071785.

*Primary Examiner* — Leah Simone Macchiarolo
(74) *Attorney, Agent, or Firm* — Saul Ewing Arnstein & Lehr LLP

(57) ABSTRACT

The invention relates to a light guiding device for guiding light. The light guiding device comprises at least one light guide, at least one beam splitter element, and at least one light decoupling device. The at least one light guide comprises at least two layers. The at least one beam splitter element is provided between the at least two layers of the at least one light guide, where the at least one beam splitter element is designed for partially transmitting and reflecting incident light propagating in the at least one light guide. The at least one light decoupling device is provided for coupling incident light out of the at least one light guide. Furthermore, the invention also relates to an illumination device and a display device for displaying two-dimensional and/or three-dimensional information comprising such a light guiding device.

29 Claims, 9 Drawing Sheets

(56) References Cited

U.S. PATENT DOCUMENTS

| | | | |
|---|---|---|---|
| 2006/0228073 A1* | 10/2006 | Mukawa | G02B 5/18 385/31 |
| 2006/0255346 A1 | 11/2006 | Kunimochi | |
| 2012/0044572 A1 | 2/2012 | Simmonds et al. | |
| 2017/0139116 A1 | 5/2017 | Zeng | |
| 2017/0307800 A1 | 10/2017 | Fattal | |
| 2017/0363793 A1 | 12/2017 | Montgomery et al. | |
| 2017/0371090 A1 | 12/2017 | Fattal | |

* cited by examiner

LIGHT GUIDE DEVICE AND ILLUMINATION DEVICE HAVING A LIGHT GUIDE DEVICE

CROSS REFERENCE TO RELATED APPLICATIONS

This application claims the priority of PCT/EP2019/071785, filed on Aug. 14, 2019, which claims priority to European Application No. EP 18190678.5, filed on Aug. 24, 2018, the entire contents of each of which are incorporated fully herein by reference.

BACKGROUND OF THE INVENTION

The present invention relates to a light guiding device for directing and guiding light. Furthermore, the present invention relates to an illumination device having at least one light source and a light guiding device according to the invention. Moreover, the present invention also relates to a display device, in particular a holographic display device, which comprises an illumination device according to the invention. Two-dimensional and/or three-dimensional image information can be displayed using the display device or display.

In particular, the present invention relates to light guiding devices and illumination devices which can be used to illuminate at least one spatial light modulation device, which is in turn preferably used in a display device for displaying two-dimensional and/or three-dimensional information, such as objects and scenes.

Light guiding devices are frequently used in illumination devices in order to guide the light emitted by a light source according to certain specifications therein. Illumination devices can be provided as backlight devices or as frontlight devices. They are generally used to illuminate a transmissive or reflective spatial light modulation device in a display device. The light used therein can be both incoherent and also coherent. Incoherent light is preferably used in two-dimensional display devices, which display autostereoscopic three-dimensional information. Coherent light, in contrast, is required in the holographic representation of information.

In a display device for displaying a two-dimensional and/or three-dimensional information, it is important that bright and homogeneous illumination of the entire surface of the spatial light modulation device provided in the display device is present with the highest possible resolution. The spatial light modulation device, which is used as a display panel, is to emit the light in a large angular range, so that the displayed information is viewable or observable in this large angular range.

Illumination devices are known in this case which comprise a light guide or waveguide for illuminating the spatial light modulation device. Light guides generally comprise a light conducting core and a cladding layer. However, light guides are also known which do not have a cladding layer. The light coupled into the light guide propagates in the light guide in the form of light beams or wave fields, which are then coupled out in order to areally illuminate a spatial light modulation device, for example.

Special requirements have to be met in particular for the illumination of a spatial light modulation device. The information to be displayed for at least one observer is written or encoded in the spatial light modulation device. The light emitted by a light source is modulated using the information encoded in the spatial light modulation device. The information is encoded in the form of amplitude values and phase values in the pixels of the spatial light modulation device. Therefore, a parallel light incidence on the spatial light modulation device is required. The requirement for the light guide is therefore that it emits collimated light. In particular in the case of information to be generated holographically, in order to achieve a high quality with respect to the preferably three-dimensional information to be displayed, this means that a defined collimation of the light beams coupled out of the light guide has to be present. Moreover, a most homogeneous possible illumination of the entire surface of the spatial light modulation device has to be achieved.

Various approaches are known in order to implement a homogeneous illumination, in particular for a spatial light modulation device.

For example, a backlight unit is known from US 2017/0363793 A1, which comprises a light guide and a barrier layer in the light propagation direction over the light guide. The barrier layer defines an aperture region, where an active region from which light is output from the light guide, is adjoining to the aperture region. A prism structure is used to couple light into the light guide.

US 2006/0255346 A1 describes an illumination device comprising two light guide plates arranged one over the other. Each light guide plate is coupled to a spot light source, which emits light of one wavelength. The light coupled into the light guide plates is guided via a light output mechanism in such a way that the color heterogeneity is suppressed.

Furthermore, a light guide plate is known from US 2017/0139116 A1 which comprises two wedge-shaped light guide layers, which are joined together so that a plane-parallel light guide plate results. A connecting layer is provided between the wedge-shaped light guide layers, which is formed as a reflection layer and has interlocking points, which are arranged on two opposing surfaces of the connecting layer. Light enters the first wedge-shaped light guide layer and the connecting layer and is reflected at the interlocking points of the connecting layer. The light reflected in this way is in turn guided by the first wedge-shaped light guide layer to a light-exiting surface of the first wedge-shaped light guide layer, where it exits from the light guide plate. The light efficiency is thus increased.

A constant output power of the light after the exit or the coupling of the light out of the light guides and thus a homogeneous illumination cannot be achieved using such illumination devices known in the prior art, however. However, this is necessary in particular in the case of illumination of a spatial light modulation device for a holographic reconstruction of information.

SUMMARY OF THE INVENTION

It is therefore the object of the present invention to provide a device, using which a homogeneous illumination and a constant light power are achievable in a simple manner using few components and cost-effectively. Furthermore, a flat device which is compact in its structural space is to be provided for this purpose.

The object is achieved according to the invention by a light guiding device having the features of the claims.

A light guiding device is provided according to the invention, using which the abovementioned disadvantages of the prior art can be avoided. The light guiding device comprises at least one light guide, at least one beam splitter element, and at least one light decoupling device. The at least one light guide comprises at least two layers in this case. The at least one beam splitter element is provided between the at least two layers of the at least one light guide. The at least one beam splitter element is designed to partially transmit and reflect incident light propagating in the at least one light guide. This means that the at least one beam splitter element is designed to be partially reflective, so that a certain part of the light incident on the at least one beam splitter element in the at least one light guide is reflected and the other remaining part of the light is transmitted by the at least one beam splitter element. The transmitted part of the light therefore reaches the further provided layer of the at least one light guide, in which the light also propagates accordingly. The at least one light decoupling device is provided for coupling incident light out of the at least one light guide.

Due to the provision or arrangement according to the invention of at least one beam splitter element between the at least two layers of the at least one light guide, the light can propagate in the at least one light guide and can be coupled by means of the at least one light decoupling device out of the at least one light guide in such a way that the decoupled light has high homogeneity or a homogeneous intensity distribution of the decoupled light is present. Moreover, a high light output power is present in the light propagation direction after the light guiding device. Furthermore, by way of such a structure of the light guiding device according to the invention, it can be kept compact and moreover flat, so that this light guiding device is particularly well suitable for an illumination device in a display device for two-dimensional and/or three-dimensional display of information such as objects and scenes.

In one particularly advantageous embodiment of the invention, the light guiding device can comprise at least one light guide which has at least three layers. In this embodiment, at least two beam splitter elements are provided, which are each arranged or provided between two layers of the at least one light guide. In this way, an even higher level of homogeneity of the decoupled light intensity can be achieved or the homogeneity can be further optimized.

The light can propagate according to the invention within the at least one light guide, i.e., within the at least two layers, via a reflection on boundary surfaces of the at least one light guide. The light can preferably propagate in the at least one light guide, in particular within the at least two layers, via total internal reflection. This means that the angle of the coupled-in light beam or light bundle in relation to the normal on the light coupling surface of the at least one light guide is greater than the critical angle of the total internal reflection.

The light guiding device according to the invention can be used, for example, in direct view displays, in projection display devices, in head-up displays, or also in head-mounted displays, where other applications are not to be excluded in this way. The light guiding device can thus be used and employed everywhere a homogeneous illumination or decoupling of light is required.

Further advantageous embodiments and refinements of the invention result from the dependent claims.

In one advantageous embodiment of the invention, it can be provided that the at least one light guide is formed cuboidal, where the at least one beam splitter element is formed planar and is provided essentially in parallel to the boundary surfaces of the light guide. The at least one light guide of the light guiding device according to the invention is formed cuboidal, i.e., the cross section of the light guide is formed rectangular. The light guide preferably has four long lateral surfaces and two lateral surfaces shorter in relation thereto. The at least one beam splitter element is formed planar, preferably as a very thin layer. Moreover, the at least one beam splitter element is arranged essentially in parallel to the boundary surfaces, i.e., preferably to the long lateral surfaces, of the light guide between the at least two layers. In this way, the at least one beam splitter element therefore partitions the light guide into the at least two layers.

In a further advantageous embodiment of the invention, it can be provided that the light propagating in the at least two layers of the at least one light guide is coupled to one another via the at least one beam splitter element. The light falling into the at least one light guide and incident on the at least one beam splitter element propagates by beam splitting upon each incidence of the light on a location of the at least one beam splitter element in the one layer, for example the lower layer, and also in the other layer, for example the upper layer, of the light guide, whereby strong coupling results between the at least two layers and the propagating light beams are mixed in the light guide.

Furthermore, it can be provided according to the invention that a suitable ratio of transmission to reflection of the at least one beam splitter element can be selected for essentially homogeneous and efficient coupling of the light out of the at least one light guide. For example, a ratio of transmission to reflection of the at least one beam splitter element of 50% to 50% can be selected. This means that the at least one beam splitter element reflects the incident light 50% and transmits it 50%, so that half of the incident light is reflected at the at least one beam splitter element and propagates further in the one layer of the light guide and the other half of the incident light penetrates the at least one beam splitter element and thus reaches the other layer of the light guide, in which it also propagates further.

Of course, other suitable ratios of transmission to reflection are also possible, for example 60% transmission to 40% reflection or also 40% transmission to 60% reflection. A ratio of the reflection of 38.2% to a transmission of 61.8% has proven to be particularly suitable. However, the invention is not to be restricted to such ratios.

In one embodiment of the invention, it can advantageously be provided that the at least one light decoupling device comprises at least one diffractive optical element, preferably a volume grating or a surface grating.

For coupling the light out of the light guide of the light guiding device according to the invention, the at least one light decoupling device can comprise at least one diffractive optical element. The at least one diffractive optical element can be applied as an element to a light decoupling surface of the light guide or can be provided in the light guide. However, it is also possible that the at least one diffractive optical element is divided into individual segments, which are applied to a light decoupling surface of the light guide or are provided in the light guide. The individual segments of the at least one diffractive optical element are provided or applied to the light decoupling side of the light guide or are provided in the light guide in such a way that these segments continuously adjoin one another or also partially overlap in the edge region, so that coupling out of the light in this region of the light guide is not disturbed.

It is furthermore possible that the at least one light decoupling device also comprises multiple diffractive optical elements, i.e., at least two diffractive optical elements. For example, for a color display of information by means of a display device, preferably a holographic display device, which comprises an illumination device having the light guiding device according to the invention, it is advantageous to provide a diffractive optical element suitable for this purpose in the light decoupling device for each wavelength used or color to be displayed. This means that for a color display of information in RGB (red, green, blue), the light guiding device comprises at least three diffractive optical elements which are adapted to the respective wavelength or color. These diffractive optical elements can also in turn be divided into individual segments.

In particular volume gratings or surface gratings are suitable as diffractive optical element(s) here. Volume gratings can provide a collimated emission of coherent light in particular. Volume gratings represent a stack of transparent or also reflective layers and can be described as modulated distributions of the indexes of refraction in the x and y directions. A volume grating is designed in such a way that a defined part of the light energy or the light is coupled out in a predetermined or established angular range. The volume grating or gratings of the light decoupling device direct the incident light propagating in the light guide at an angle α upon the decoupling in a direction perpendicular to the boundary surface of the light guide.

It can advantageously be provided that a partially-reflective layer is provided, which is arranged between a boundary surface of the at least one light guide and the at least one diffractive optical element.

A partially-reflective layer can be provided and arranged between a boundary surface of the at least one light guide and the at least one diffractive optical element or the light decoupling device. It could also be part of the light decoupling device. This partially-reflective layer can be applied for this purpose, for example, to the at least one diffractive optical element and can be directed toward the boundary surface of the light guide. The partially-reflective layer partially reflects incident light, where the other non-reflected part is transmitted by the partially-reflective layer and is thus let through it. The light transmitted by the partially-reflective layer is then incident on the light decoupling device, by means of which it is coupled out of the light guide and thus of the light guiding device. For example, approximately 80% of the light is reflected by the partially-reflective layer, so that this light can propagate further in the light guide. Approximately 20% of the light is therefore transmitted by the partially-reflective layer and accordingly coupled out of the light guide.

It can advantageously be provided that the reflectivity of the partially-reflective layer is optimized with respect to the homogeneity and the efficiency of the light coupled by means of the light decoupling device out of the at least one light guide.

In order to increase the homogeneity and the efficiency of the light coupled out of the at least one light guide, the reflectivity of the partially-reflective layer can be adapted and optimized. The reflectivity of the partially-reflective layer is defined and established in such a way that high homogeneity and efficiency of the decoupled light is achieved using it.

Moreover, it can be advantageous if the reflectivity of the partially-reflective layer and the reflectivity of the at least one beam splitter element are adapted to one another.

In this way, the homogeneity of the decoupled light can be further increased.

In one special embodiment of the invention, it can be provided that the partially-reflective layer has a location-dependent transmission and reflection.

The partially-reflective layer can thus be designed as a gradient layer. This partially-reflective layer having location-dependent transmission and reflection can be constructed in such a way that in the region of the light coupling into the light guide, the partially-reflective layer has low transmission and high reflection of the light, while in contrast in the propagation direction of the light in the light guide in an end region of the light guide, i.e., in a region opposite to the light coupling region of the light guide, high transmission and low reflection are present.

A gradient layer or location-dependent transmission and reflection in a layer can advantageously be used if the light guiding device is illuminated using at least one light source from one side. This means the light is coupled from one side into the light guide. A light source can comprise multiple sub-light sources. For example, a light source can comprise multiple sub-light sources of the same wavelength or having different wavelengths, for example in the RGB (red-green-blue) spectral range. Of course, a light source can also be understood as only one light-emitting unit.

In an alternative embodiment of the invention thereto, it can be provided that the at least one diffractive optical element has a diffraction efficiency of η<100%, or the at least one diffractive optical element has a location-dependent diffraction efficiency.

The at least one diffractive optical element having location-dependent diffraction efficiency can be designed in such a way that in the region of the light coupling into the light guide, the at least one diffractive optical element has a low diffraction efficiency, while in contrast in the propagation direction of the light in the light guide in an end region of the light guide, i.e., in a region opposite to the light coupling region of the light guide, a high diffraction efficiency is present.

The at least one diffractive optical element having location-dependent diffraction efficiency can advantageously be used if the light guiding device is illuminated using at least one light source from one side. This means the light is coupled from one side into the light guide.

In a further special embodiment of the invention, it can be provided that the at least one light decoupling device has a constant reflectance provided over its surface.

The provision of a constant reflection over the surface of the at least one light decoupling device of the light guiding device is particularly advantageous if the light guiding device is illuminated by two light sources arranged opposite to one another. In this case, light can be coupled from two sides into the light guide, so that a part of the light propagating in the light guide is coupled out of the light guide upon each incidence on the light decoupling device and the part of the light reflected at this location propagates further in the light guide and is coupled out of the light guide at following positions or locations of the light guide. Due to the coupling in of the light from two sides, the light propagates in opposite directions to one another, so that the respective decoupled light has intensity errors or inhomogeneities opposing to one another, which at least partially compensate for one another due to the two-sided light coupling, however. In this way, a constant reflectance can be achieved over the surface of the light decoupling device. In other words, due to coupling of the light from two sides into the light guide, good or high homogeneity of the decoupled light can also be achieved with a constant reflectance of the light decoupling device. A light decoupling device having constant reflectance is particularly advantageous with respect to the production of the partially-reflective layer. The partially-reflective layer may be produced more easily, where it can also be manufactured more cost-effectively.

The at least one light decoupling device can advantageously be designed to be transmissive or reflective.

In order to increase the intensity of the decoupled light, it can advantageously be provided that at least one mirror element is provided on a lateral surface of the at least one light guide present in the light propagation direction.

In this case, one mirror element or also multiple mirror elements can be provided on at least one lateral surface of the at least one light guide. It is also possible that both lateral surfaces, from and/or to which the light propagates in the light guide, include one mirror element or also multiple mirror elements. This or these mirror element(s) is/are provided for reflection of the light not coupled out of the light guide, so that the reflected light can still propagate in the light guide and be coupled out. In this way, the efficiency of the light guiding device can be increased.

In order to provide and ensure high homogeneity and high efficiency of the light coupled out and originating from the light guiding device, it can be provided according to the invention that a light propagation angle in the at least one light guide is in a range between 60° to 85°, preferably in a range between 70° and 80°.

In one particularly advantageous embodiment of the invention, it can be provided that intensity errors in the light output power, which is coupled out of the at least one light guide, can be compensated for by means of a location-dependent input intensity distribution of the light which can be coupled into the light guide.

To generate a location-dependent input intensity distribution of the light which is coupled into the at least one light guide, for example, a linear gradient gray filter can be used, which accordingly sets or adapts the intensity distribution incident on the light guide. However, a diffractive optical element could also be used to generate a location-dependent input intensity distribution of the light, which redistributes the intensity of the light accordingly.

In a further embodiment of the invention, it can be provided that at least one light coupling device is provided, which is arranged on the at least one light guide and is provided for coupling incident light into the light guide.

At least one light coupling device is advantageously provided for coupling the light into the at least one light guide. For this purpose, the light coupling device can comprise at least one diffractive optical element, preferably a volume grating or a surface grating, or at least one mirror element or at least one prism element. The light coupling device is designed in such a way that using this light coupling device, the light bundle incident on the light guide, which consists of a plurality of light beams, can be coupled completely into the light guide. The light coupling device is thus formed in its size in such a way that the light emitted from at least one light source is incident completely on the surface of the light coupling device and this incident light can be coupled by means of the light coupling device into the light guide.

The profile of the light intensity distribution entering the at least one light guide can advantageously be a Gaussian profile, a sawtooth profile, or a rectangular profile.

Simulations have shown that a Gaussian profile, a sawtooth profile, or a rectangular profile is particularly well suitable as a profile for a light intensity distribution entering the light guide in conjunction with the light decoupling device designed according to the invention, in order to achieve a homogeneous and efficient intensity distribution of the light coupled out of the light guiding device.

Furthermore, it can be provided according to the invention that the at least one light decoupling device is designed for coupling out light propagating in the at least one light guide in each case upon each incidence on the light decoupling device, so that light segments are generatable, which can be coupled out of the light guide.

The at least one light decoupling device is designed according to the invention in such a way that in each case a defined part of the light which is incident on the light decoupling device during the propagation of the light in the layers of the at least one light guide is coupled out by means of this light decoupling device. The component of the light which is to be coupled out by means of the light decoupling device is determined by the design of the light decoupling device, i.e., by the provided or defined ratio of transmission to reflection. Since a specific or defined part of the light is coupled out of the light guide of the light guiding device at each location at which the light propagating in the light guide is incident on the light decoupling device, multiple light segments are generated, which represent a homogeneous and efficient light intensity distribution when seen together.

The generated light segments can advantageously be arranged continuously adjacent to one another or overlapping one another.

It is particularly preferable if the individual light segments are arranged adjacent to one another overlapping one another. In any case possibly occurring spaces or gaps between the individual light segments, which are caused, for example, by effects or errors generated by the at least one light coupling device, can thus be avoided, so that the homogeneity of the decoupled light is not disadvantageously impaired.

It can be very advantageous if a width of a light bundle to be coupled into the at least one light guide is already determined at the coupling position of the light guide in such a way that homogeneous and efficient coupling of the light out of the light guide is achievable.

Such a previously determined or defined width of a light bundle to be coupled into the light guide may be ascertained beforehand via mathematical calculations.

The maximum width $L_{in}$ of the coupled-in light at the coupling position of the light guide is determined by $L_{in}=2d/\tan(\alpha)$, where d is the total thickness of the light guide and the angle $\alpha$ is the propagation angle of the light in the light guide at which the light is incident on the light guide. The width of each decoupled light segment is also $L_{in}$.

It can furthermore be provided according to the invention that the distance of the individual decoupled light segments from one another is determined by the individual thicknesses of the at least two layers of the light guide.

The distance of the individual light segments from one another can be influenced and thus defined and established by the thicknesses of the at least two layers of the light guide. It is therefore possible to design the thicknesses of the at least two layers of the light guide in such a way that the individual light segments coupled out of the light guide mutually overlap, so that no gaps or spaces can result between these light segments and a high homogeneity of the decoupled light is present.

The maximum width of each light segment is determined by the total thickness of the light guide, therefore by the abovementioned formula $L_{in}=2d/\tan(\alpha)$. However, the distance of the individual light segments from one another is determined by the thicknesses of the at least two layers of the light guide. The thicknesses of the at least two layers can thus be defined and formed in such a way that the distance between the at least two layers is less than the maximum width $L_{in}$ of the coupled-in light and therefore an overlap of the individual light segments results or is thus generated.

In one embodiment according to the invention, it can moreover be provided that the light guiding device is coupled to at least one light source, which directs light and orients it on the light guiding device.

In one particularly advantageous embodiment of the invention, it can be provided that two light sources are coupled to the light guiding device, where the light guiding device is illuminatable from a first side by means of a first light source and the light guiding device is illuminatable from a second side by means of a second light source.

By way of such a coupling of the light guiding device according to the invention to two light sources, where one light source is arranged in each case on one side of the light guiding device, so that the two light sources are located opposite to one another in the region of the light guiding device, in a simple manner and without high costs, improved homogeneity in comparison to the use of only one light source and high efficiency of the decoupled light intensity distribution can be achieved.

The light sources can be arranged in the propagation direction on an upper side or a lower side of the light guide at opposing end sections of the light guide. In addition, there are further options for arranging the light sources with respect to the upper side and the lower side of the light guide. For example, both light sources can be arranged on an upper side or lower side of the light guide or one light source can be arranged on the upper side and the other light source on the lower side.

In a further particularly advantageous embodiment of the invention, it can be provided that at least two light guides are provided for expanding the light in two directions different from one another. Three light guides are preferably provided.

To expand light in two directions different from one another, preferably in two directions perpendicular to one another, the light guiding device according to the invention can comprise two, preferably three light guides. In this case, one light guide thereof can be formed rod-shaped and one light guide can be formed cuboidal or planar. The cuboidal light guide can be arranged downstream of or can follow the rod-shaped light guide in the light propagation direction. If three light guides are provided, advantageously two light guides thereof can be formed rod-shaped and one light guide can be formed cuboidal or planar. The cuboidal light guide can be arranged downstream of or can follow the rod-shaped light guides in the light propagation direction. In this way, a one-dimensional expansion of the light can be carried out by means of the one (two) rod-shaped light guide(s), i.e., in one direction, for example the horizontal direction, there is a strip-shaped homogeneous light intensity distribution. By means of the cuboidal or planar light guide arranged downstream of the one (two) rod-shaped light guide(s), the occurring strip-shaped light intensity distribution(s) can advantageously be coupled therein and expanded in a further direction. This means that an expansion of the light in a direction approximately perpendicular to the direction of the strip-shaped or one-dimensional light intensity distribution can be achieved using the cuboidal light guide, so that a planar or two-dimensional light intensity distribution is generated or is present in the light propagation direction after the cuboidal light guide. A light guiding device constructed in this way can thus advantageously be used if a planar or two-dimensional homogeneous light intensity distribution is desired or required.

The present object of the invention is furthermore achieved by an illumination device having the features of the claims.

The illumination device according to the invention comprises at least one light source for emitting light and a light guiding device according to the invention. The light guiding device according to the invention is designed here for guiding the light emitted by the at least one light source. The light guiding device according to the invention can advantageously be used in an illumination device which is provided to generate and emit homogeneous and efficient decoupling of light.

In one advantageous embodiment of the invention, it can be provided that the illumination device comprises a collimation unit for collimating the light emitted by the at least one light source.

The present object of the invention is also achieved by a display device having the features of the claims.

According to the invention, the display device comprises at least one illumination device according to the invention, which comprises at least one light guiding device according to the invention, at least one spatial light modulation device, and at least one optical system. The display device according to the invention is used to display two-dimensional and/or three-dimensional information. This two-dimensional and/or three-dimensional information can be generated in stereoscopic, in particular autostereoscopic, ways or also preferably in holographic ways. The at least one spatial light modulation device can be illuminated for this purpose by the illumination device. The optical system provided in the display device is used together with the at least one spatial light modulation device to generate the information to be displayed.

The display device according to the invention can be designed as a direct view display, as a projection display device, as a head-up display, or also as a head-mounted display.

There are now various possibilities for advantageously embodying the teaching of the present invention and/or combining the described exemplary embodiments or embodiments with one another. For this purpose, reference is made to the claims dependent on the independent claims, on the one hand, and to the following explanation of the preferred exemplary embodiments of the invention on the basis of the drawings, on the other hand, in which generally preferred embodiments of the teaching are also explained. The invention is explained here in principle on the basis of the described exemplary embodiments, but is not to be restricted thereto.

BRIEF DESCRIPTION OF THE DRAWINGS

In the figures.

It is to be briefly noted that identical elements/parts/components can also have identical reference signs in the figures.

DETAILED DESCRIPTION OF THE INVENTION

Figure 1:
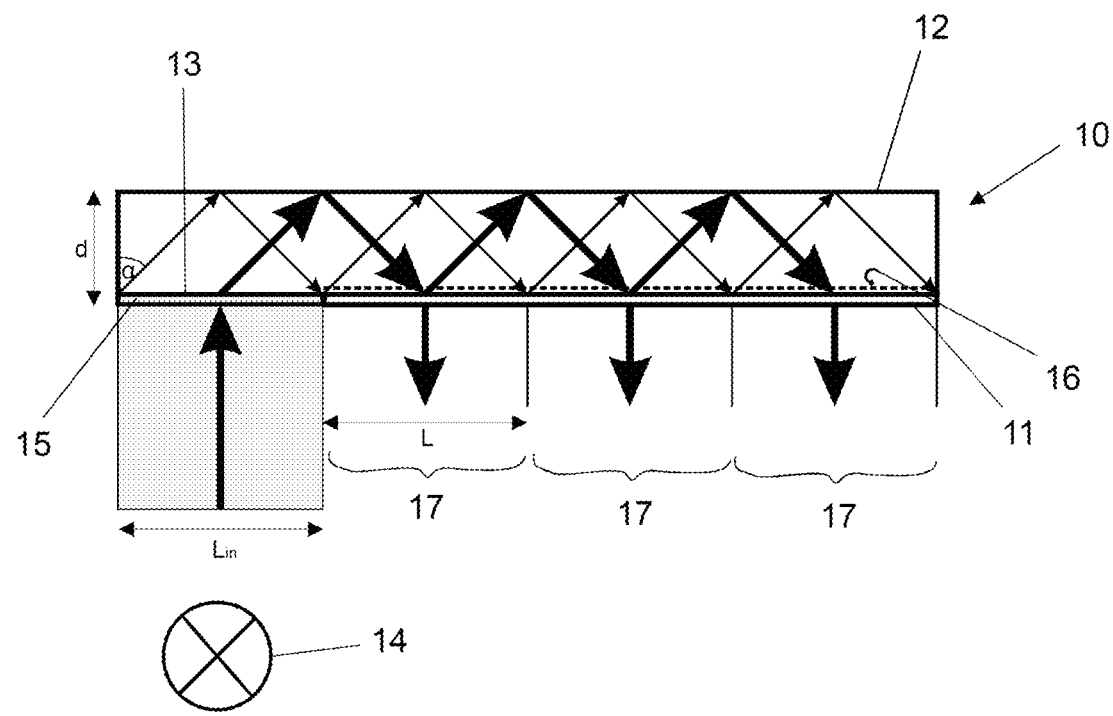
FIG. 1: shows a schematic illustration of an embodiment of a light guiding device according to the invention.

FIG. 1 shows a light guiding device, which comprises a light guide 10 and a light decoupling device 11. Such a light guiding device can be used, for example, for an illumination device in a display device for displaying two-dimensional and/or three-dimensional information, for example, objects or scenes. The light guide 10 is constructed here from a single light-guiding layer and can comprise a cladding layer, which is not shown in FIG. 1. The light guide 10 can be produced, for example, from plastic, e.g. PMMA or polycarbonate, or glass. Moreover, the light guide 10 is formed cuboidal, i.e., the cross section of the light guide 10 is rectangular or oblong. Boundary surfaces 12 and 13 of the light guide are thus provided in a parallel arrangement in relation to one another. The light originating from a light source 14 is coupled by means of a light coupling device 15 into the light guide 10 of the light guiding device. The light coupling device 15 can comprise at least one diffractive optical element. The at least one diffractive optical element could be, for example, a volume grating or also a surface grating. Furthermore, the light coupling device 15 for coupling the light into the light guide 10 could also comprise at least one prism element or at least one mirror element. However, at least one volume grating is preferred for coupling light into the light guide 10. As can be seen in FIG. 1, the light emitted by the light source 14 is guided to the light guide 10. For this purpose, it is necessary for the light coupling device 15 to have a corresponding size, so that all of the light which is incident on the light guide 10 can also be coupled into the light guide 10. This means that the light coupling device 15 is adapted to the cross section of the incident light. The propagation of the light in the light guide 10 preferably takes place via total internal reflection, i.e., the angle of incidence a of the light on the light coupling device 15 and thus on the light guide 10 is, in relation to the normal to the surface of the light guide, greater than the critical angle of total internal reflection. However, it is also possible that one or both boundary surfaces 12 and 13 of the light guide 10 has (have) a reflective coating, in order to cause the light to propagate accordingly in the light guide 10. The light propagating in the light guide 10 propagates in a zigzag shape, as is to be indicated by means of the illustrated arrows.

Upon each incidence of the light in the light guide 10 on the boundary surface 13, which is provided with the light decoupling device 11, a part of the light is coupled out of the light guide 10 by means of the light decoupling device 11. For this purpose, the light decoupling device 11 is formed planar and is provided over a region of the boundary surface 13 or a surface of the light guide 10. This region provided for the light decoupling, which is provided with the light decoupling device 11, extends from the end of the region of the light coupling device 15 up to the outer end region of the light guide 10 viewed in the light propagation direction, as shown in FIG. 1. The light decoupling device 11 comprises at least one diffractive optical element. The diffractive optical element can also be formed here as a diffraction grating, in particular as a volume grating or surface grating. Furthermore, the light guiding device comprises a partially-reflective layer 16, which reflects parts of the light incident thereon and transmits or lets through remaining parts of the light. The partially-reflective layer 16 is preferably arranged between the light guide 10, i.e., between the boundary surface 13 of the light guide 10, and the light decoupling device 11 and is formed from a multi-layer stack, which comprises layers having high and low indices of refraction. The reflectivity and therefore also the transmission of the partially-reflective layer 16 are definable and can be varied and optimized in accordance with the desired efficiency and homogeneity of the light coupled out of the light guiding device. For example, the partially-reflective layer 16 can be formed in such a way that at each of the respective light incidence positions of the partially-reflective layer, approximately 80% of the incident light is reflected and approximately 20% of the incident light is transmitted or let through. This statement on the reflectivity is only to be used as an example here. Of course, other ratios of the reflectivity to the transmission are also possible and suitable. The ratio of the reflectivity to the transmission is to be set or defined in such a way, however, that the highest possible homogeneity and high efficiency of the light coupled out of the light guiding device is achievable. In order to achieve this, the partially-reflective layer 16 has location-dependent transmission and reflection, i.e., the partially-reflective layer 16 is formed as a gradient layer. In other words, the partially-reflective layer 16 has a gradient and has high reflection and low transmission here in the region of the light coupling device 15, where the partially-reflective layer 16 has low reflection and high transmission in the end region of the light guide 10 in the light propagation direction. In order to achieve high homogeneity and constant output power of the decoupled light or the decoupled light intensity distribution, the transmission T of the partially-reflective layer 16 is to be defined as described in the following. A constant output power $dP/dx$ is required. Therefore, the power of the light in the light guide is to correspond to a linear curve.

With the boundary conditions that $P(0)=1$ and $P(1)=r$, where r is the remaining power of the light in the light guide, and the dimensionless coordinates $x=x'/L$, a power of:

$P(x)=1-(1-r)\cdot x$ results.

The decoupling coefficient of the light is given here by:

$$\eta(x) = -\frac{dP/dx}{P} = \frac{1-r}{1-(1-r)\cdot x}.$$

The scaled transmission T and reflection R of the partially-reflective layer 16 can thus be concluded, which are defined as follows:

$$T(x) = 2\cdot d \cdot \frac{\tan(\alpha)}{L} \cdot \frac{1-r}{1-(1-r)\cdot x} \text{ and}$$

$$R(x) = 1 - T(x),$$

where L is the length of the light guide used.

By means of such a partially-reflective layer having location-dependent transmission and reflection, the homogeneity of the decoupled light can be increased and significantly improved. For example, in this way the reflection in the region of the light coupling device 15 could be defined and set to approximately 90%, where the reflection then drops or decreases continuously in the light propagation direction along the partially-reflective layer 16 up to the end region of the light guide 10 to approximately 50%.

The light transmitted by the partially-reflective layer 16 is then incident on the light decoupling device 11. The light decoupling device 11 then deflects the incident light, for example from a light beam propagating in the light guide 10 at an angle α into a light beam which exits from the light guiding device at a perpendicular angle to the surface of the light guide 10. This perpendicular light decoupling from the light guiding device is shown by means of the illustrated arrows in FIG. 1. Upon each incidence of the light or light bundle propagating in the light guide 10 on the partially-reflective layer 16, a defined part of the light is transmitted and is incident on the light decoupling device 11, which couples this defined part of the light out of the light guide and thus out of the light guiding device. In this way, individual light segments 17, which are coupled out, are formed or generated at the decoupling position of the light decoupling device 11.

As is apparent from FIG. 1, the width of the light bundle to be coupled into the light guide 10, which is to be represented here by the arrow and the gray region behind the arrow, is characterized at the light coupling position or at the light incidence position of the light guide 10 with the parameter $L_{in}$. A maximum width of a light bundle to be coupled into the light guide 10 is preferably to be $L_{in}=2d/\tan(\alpha)$, where d is the thickness of the layer of the light guide and a is the angle of incidence of the light on the surface of the light guide. A light incidence bundle, the width of which is greater than $L_{in}=2d/\tan(\alpha)$, would therefore, as shown in FIG. 1, strike a part of the light decoupling device 11, whereby interfering reflections could occur.

As already described, the light coupled out of the light guide 10 or the light guiding device consists of light segments 17. These light segments 17 also each have a width of $L_{in}=2d/\tan(\alpha)$ and a periodicity or period of $L=2d/\tan(\alpha)$. Since $L_{in} \leq L$, there is no overlap of the individual light segments 17 in their edge regions. However, the individual light segments 17 are coupled out of the light guide 10 in such a way that these light segments 17 are generated and coupled out continuously adjacent to one another. Inhomogeneities of the decoupled light can result if gaps or spaces exist between the individual light segments 17. In order to avoid these visible gaps or spaces between the individual decoupled light segments 17 and thus to improve the homogeneity of the decoupled light, the width of the coupled-in light bundle is to be adapted accordingly.

Figure 2:
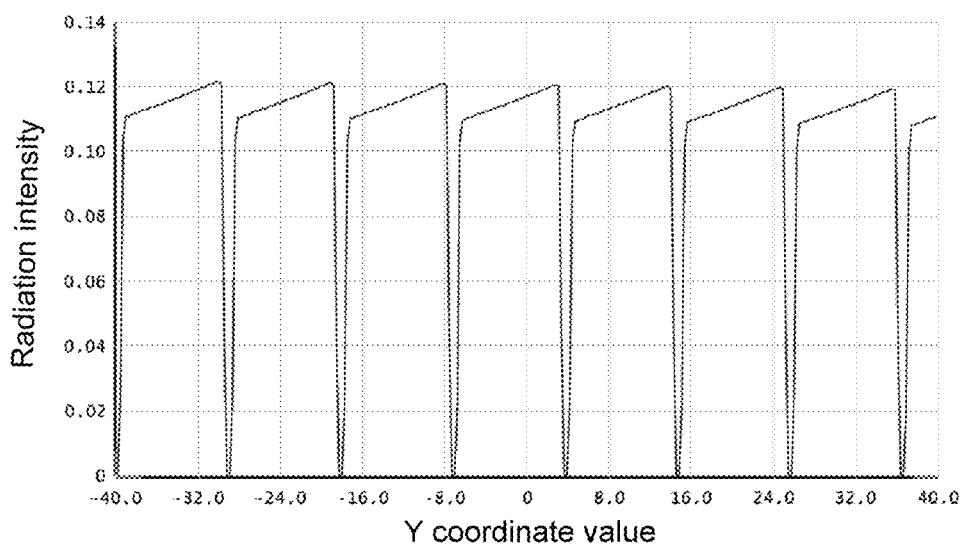
FIG. 2: shows a representation in a graph of an output intensity distribution of the light from a light guiding device according to FIG. 1.

An output light intensity of a light guiding device according to FIG. 1 is shown represented in a graph in FIG. 2. This light intensity was obtained by simulations for a light guiding device having a light guide of a length L of 80 mm and a thickness d of 2 mm, where the light propagation angle α in the light guide is 70°. The transmission profile of the partially-reflective layer was selected in such a way that approximately 20% of the coupled-in light remains in the light guide. A rectangular profile of the light intensity distribution entering the light guide was used here. The width $L_{in}$ of the light bundle incident on the light guide having the rectangular profile at the incidence position of the light guide is 10 mm. As can be seen in FIG. 2, gaps or spaces having vanishing light intensity or light intensity going to zero result between each of the individually generated or formed light segments. These gaps or spaces result from the fact that the width of the light segments was selected to be somewhat smaller than their period, in order to avoid the light segments striking the edge of the light decoupling device and interfering reflections or diffraction effects resulting. This means that $L_{in}$ is less than L and therefore continuous stringing together of the light segments does not take place. Good homogeneity of the decoupled light therefore cannot be achieved.

In simulations, reflection profiles were calculated and displayed, using which a better constant light output power of the light guiding device can be achieved. It has been shown here that a light guide having a high light efficiency requires a greater drop of the reflection in the end region of the light guide. This in turn means that a partially-reflective layer for a light guiding device having a high efficiency is more demanding in its production. With respect to the sensitivity of the light guide to coating flaws or coating properties, it has been shown that light guides in which the light propagates at a smaller propagation angle, for example 60°, react more sensitively to coating flaws than light guides in which the light propagates at a greater angle, for example 80° or 85°. A light guide is therefore preferred in which the light propagates at a relatively large angle, i.e., between 75° and 85°. This also means that for a light guide in which the light propagates at a small angle, for example 60°, the propagating light completes more reflections in the light guide than for light which propagates at a greater angle. The reflectivity of the partially-reflective layer therefore has to be higher, i.e., in the region of the coupling of the light into the light guide, the reflectivity is to be approximately 98%, for example, at a propagation angle of 60°. The output power of the light reacts more sensitively to changes of the reflectivity, however. Large propagation angles in the light guide also require a large diffraction angle in the diffractive optical element of the light decoupling device, however. It has also been shown here by simulations and illuminations of a volume grating, which has been used as a diffractive optical element for light coupling out of the light guide, that, for example, a diffraction of the light from 84° to 0° is relatively difficult to achieve in photopolymer as a material for the volume grating. It is therefore preferred to use a light propagation angle in the light guide of approximately 80° and therefore also a diffraction angle of 80° in the diffractive optical element of the light decoupling device for the light guiding device according to the invention. Of course, other suitable angles are also possible.

To improve the homogeneity of the decoupled light intensity distribution and compensate for intensity errors in the light output power, instead of a typical or normal input intensity distribution of the light, a location-dependent input intensity distribution of the light can be used. The input intensity distribution or the intensity distribution of the light which is coupled into the light guide thus has a gradient. In order to achieve this, a linear gradient gray filter can be used or also a diffractive optical element can be used, which redistributes the intensity of the light accordingly.

Figure 3:
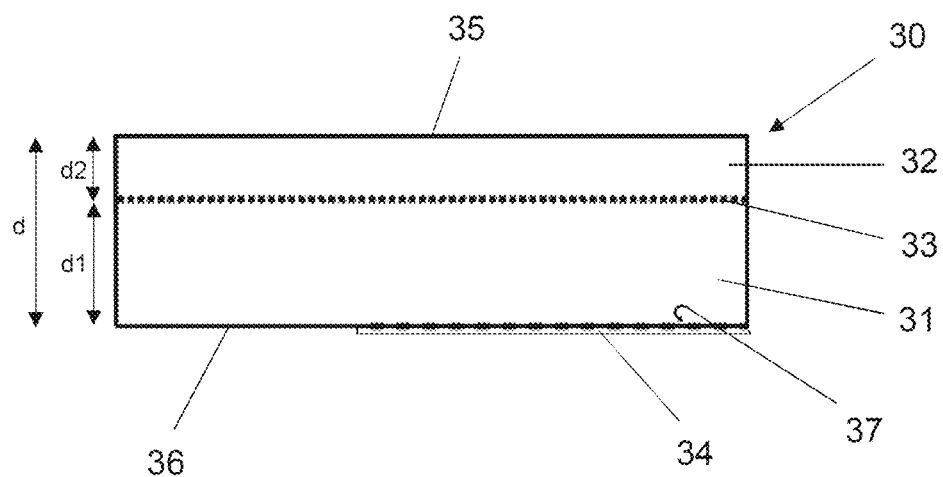
FIG. 3: shows a schematic illustration of a second embodiment of a light guiding device according to the invention.

In order to further improve or increase the homogeneity of the decoupled light, the light guiding device can comprise a light guide which has at least two layers. Such a light guiding device is schematically shown in FIG. 3. The light guiding device shown therein comprises a light guide 30 and a light decoupling device 34. The light guide 30 is also again produced here, for example, from plastic, e.g. PMMA or polycarbonate, or glass. This light guide 30 is also formed cuboidal, i.e., the cross section of the light guide 30 is rectangular or oblong. Boundary surfaces 35 and 36 of the light guide 30 are thus provided in a parallel arrangement in relation to one another. The light guide 30 has two layers 31 and 32 here, which are connected to one another via a beam splitter element 33. Both layers 31 and 32 are aligned in parallel to one another, where the beam splitter element 33 is arranged between the two layers 31 and 32. The layer 31 has the thickness d1, where the layer 32 has the thickness d2. The total thickness of the light guide 30 thus results from the individual thicknesses d1 and d2 of the two layers 31 and 32. The thickness of the beam splitter element 33 is so small, however, that it is negligible for calculations. The beam splitter element 33 is formed planar and is arranged essentially in parallel to the boundary surfaces 35 and 36 of the light guide between the two layers 31 and 32. The beam splitter element 33 is formed here for partially transmitting and reflecting incident light propagating in the light guide. This means that the beam splitter element 33 is formed partially reflective, so that a defined part of the incident light is reflected and a remaining part of the incident light is transmitted by the beam splitter element 33. For example, the beam splitter element 33 could be formed in such a way that it reflects approximately 40% of the incident light and transmits approximately 60% of the incident light. The beam splitter element 33 can consist of a plurality of layers in order to be able to react accordingly to different incident wavelengths.

The light decoupling device 34 also comprises at least one diffractive optical element for light decoupling in this embodiment of the light guiding device according to the invention. A partially-reflective layer 37 is also provided here between the light decoupling device 34 and the light guide 30 or the boundary surface 36 of the light guide 30, the reflectivity of which is adapted and optimized with respect to the homogeneity and efficiency of the decoupled light. For this purpose, reference is to be made to the statements according to FIG. 1, which also apply here.

Figure 4:
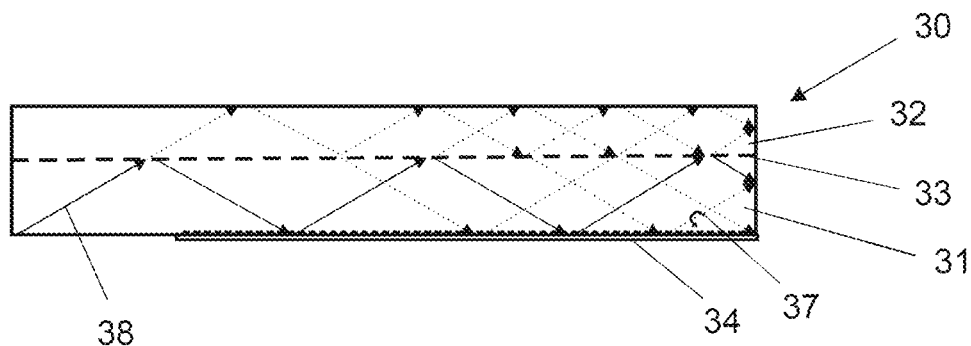
FIG. 4: shows a schematic illustration of the light guiding device according to FIG. 3 with the illustration of the light path within the light guiding device.

The path of the light propagation in a light guide 30 of the light guiding device constructed in this way is shown in FIG. 4. However, the coupling of the light into the light guide 30 is not shown here. As may be seen, the beam splitter element 33 divides the light guide 30 into the two layers 31 and 32, which are connected to one another via this beam splitter element. The light 38 coupled into the light guide 30 is incident on the beam splitter element 33, by which it is partially reflected and partially transmitted. The light is thus split by the beam splitter element 33 into two light parts. The component of the reflected light and the component of the transmitted light are defined and determined by the reflectivity of the beam splitter element 33. The reflected light then propagates further in the layer 31 and the transmitted light propagates further in the layer 32. The light propagating in the layer 32 is again incident on the beam splitter element 33, at which it is again split into two light parts. In this case, one light part is reflected again and one light part is let through by the beam splitter element 33 and enters into the layer 31 for further propagation. The light reflected at the beam splitter element 33 and thus remaining in the layer 31 is incident on a partially-reflective layer 37, which has location-dependent transmission and reflection, at which one light component is also reflected and propagates further in the layer 31 in the light guide 30 and is then incident on the beam splitter element 33, which again splits the light into two parts. The non-reflected light component of the light incident on the partially-reflective layer 37 penetrates the partially-reflective layer 37 and is incident on the light decoupling device 34, which then couples this light component out of the light guide 30 of the light guiding device. This procedure is repeated multiple times along the length of the light guide 30, so that the light propagating in the layer 31 and in the layer 32 is coupled and mixed with one another due to the beam splitting upon each incidence of the light on the beam splitter element 33. In this way, the light is coupled out of the light guide 30 at multiple positions of the light decoupling device 34, whereby light segments are generated or formed.

Figure 5:
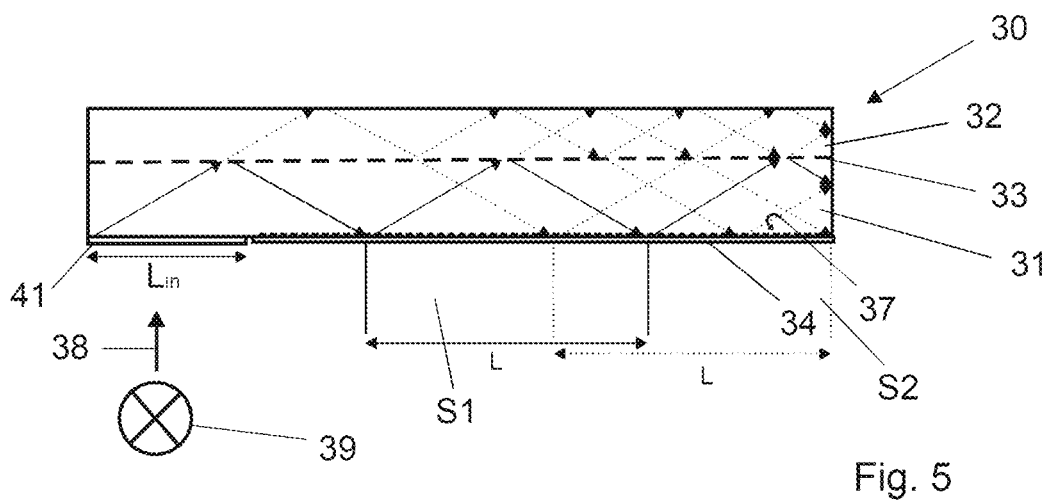
FIG. 5: shows a schematic illustration of the light guiding device according to FIGS. 3 and 4 with the procedure of the light coupling out of the light guiding device.

The generation of light segments by means of the light guiding device according to FIGS. 3 and 4 is shown in FIG. 5. The light 38 emitted by a light source 39 is coupled via a light coupling device 41 into the light guide 30 of the light guiding device. The coupled-in light then propagates in the two layers 31 and 32 of the light guide 30 according to the illustration in FIGS. 4 and 5. Upon each incidence of the light on the partially-reflective layer 37, a defined light component is transmitted by this layer 37 and is incident on the light decoupling device 34, via which the light is then coupled out of the light guide 30. The light segments $S1, S2, \ldots, S_N$ thus generated now not only result adjoining one another as shown in FIG. 1, but now overlap. Only two such light segments S1 and S2 are shown by way of example in FIG. 5. These segments S1 and S2 are primarily generated by light propagating in the layer 31, where, however, upon each incidence of light propagating in the layer 32 on the beam splitter element 33, light is also transmitted in the layer 31 and the light is thus mixed, so that propagating light from the layer 32 is also coupled out of the light guide 30 and further light segments are formed. All light segments coupled out of the light guide 30 are thus strung together overlapping one another, whereby a highly homogeneous decoupled light intensity distribution is generated or provided.

The width of each light segment $S1, \ldots S_N$ is furthermore given by $L_{in} \leq 2d/\tan(\alpha)$, as in a light guide having only one layer according to FIG. 1. This means that the width is determined by the total thickness of the light guide 30. However, the periodicity of the decoupled light segments $S1, \ldots S_N$ is determined by the individual thicknesses d1 and d2 of the two layers 31 and 32 of the light guide 30. Since the periodicity is thus less than the width of the coupled-in light or light bundle at the incidence position of the light guide, an overlap or superposition of the individual decoupled light segments $S1, \ldots S_N$ results. Due to the overlap of the individual light segments $S1, \ldots S_N$, a high homogeneity of the decoupled light can be provided. A drop of the light intensity in the region between two segments can thus be prevented.

Studies were carried out on the output intensity of the light. For this purpose, a light input intensity distribution having a triangular profile was used and coupled into a light guide. Moreover, the thicknesses d1 and d2 of the light guide were selected in such a way that they meet the condition: d1=2·d2. The light beams propagating in the light guide, which execute an additional zigzag propagation in the layer having the thickness d2, thus encounter the partially-reflective layer and the light decoupling device rather exactly between two light beams which only propagate in the layer having the thickness d1. In the case of a triangular input intensity distribution, two triangular intensity contributions to a total intensity of the light are thus generated, which are superimposed on one another, where these two triangular intensity contributions are superimposed offset by half a period in relation to one another, however. A total intensity of the light which is constant can be generated by these intensity contributions superimposed offset in relation to one another. In this way, high homogeneity of the coupled light out of the light guiding device is achieved.

Of course, it is possible to also use other profiles for the input intensity distribution of the light in the light guide in order to provide high homogeneity of the output intensity distribution of the light. This will be discussed in greater detail hereinafter.

Figure 6:
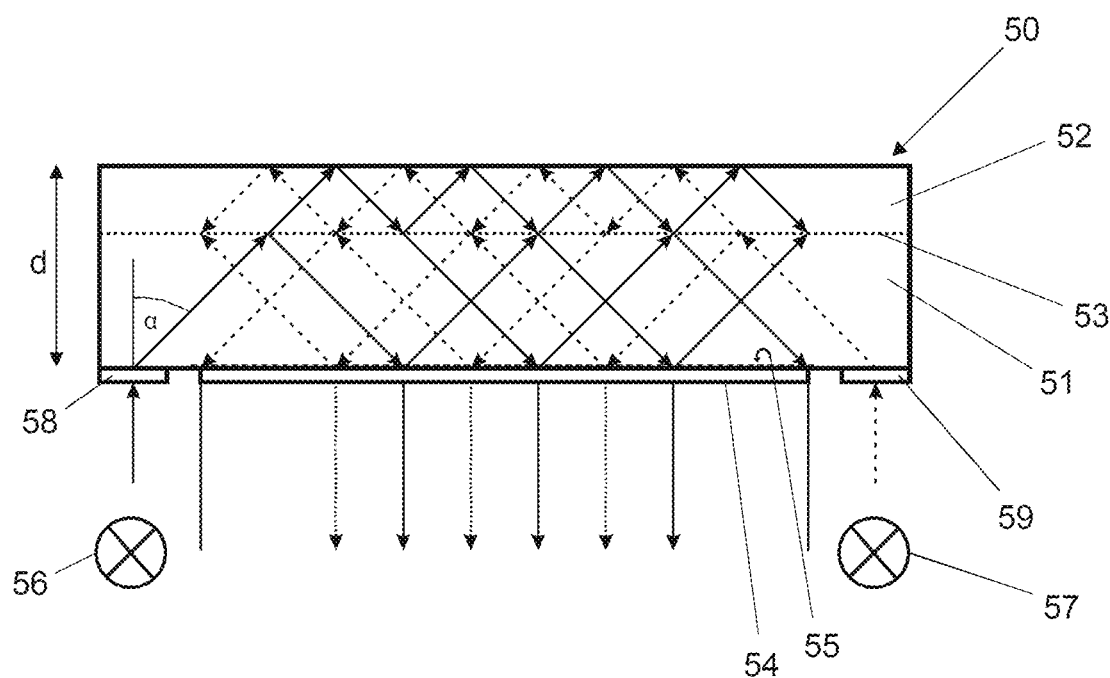
FIG. 6: shows a schematic illustration of a third embodiment of the light guiding device according to the invention, with coupling in of the light from two sides.

A further exemplary embodiment of a light guiding device is shown in FIG. 6. In this embodiment of the light guiding device, light is coupled from two sides into the light guide. A light guide 50 also again has two layers 51 and 52 here, between which a beam splitter element 53 is provided. The light guide 50 is also formed cuboidal here, where the two layers 51 and 52 are arranged in parallel to one another. The beam splitter element 53 is again arranged in the light guide 50 in parallel to boundary surfaces of the light guide 50. A light decoupling device 54 is also provided here for decoupling the light propagating in the light guide 50 in the region of a boundary surface of the light guide 50. A partially-reflective layer 55 is provided between the light decoupling device 54 and the light guide 50. This partially-reflective layer 55 does not have location-dependent transmission and reflection here, however, in contrast to FIGS. 3 to 5. This means that the partially-reflective layer 55 used here is not a gradient layer. Nonetheless, it can be advantageous in specific cases if a partially-reflective layer is formed as a gradient layer and this is used in a light guiding device according to FIG. 6.

In this embodiment of the light guiding device, two light sources 56 and 57 are provided. These two light sources 56 and 57 are each arranged in the region of one end section of the light guide 50, so that light can be coupled from two sides into the light guide 50. The light coupling into the light guide 50 takes place here via two light coupling devices 58 and 59. The light coupling devices 58 and 59 can again comprise at least one diffractive optical element, a mirror element, or a prism element. Since light is coupled here from two sides into the light guide 50 and therefore the light propagates opposite to one another in the light guide, the light decoupling device 54 also has to be designed for decoupling of the light thus propagating in the light guide. The light decoupling device 54 comprises two diffractive optical elements for this purpose, preferably two volume gratings, which are designed for the corresponding light angles of incidence of the light propagating in the light guide. This means one diffractive optical element is designed for the light angle of incidence at which the light is incident which is emitted from the light source 56 and is coupled via the light coupling device 58 into the light guide 50. The other provided diffractive optical element of the light decoupling device is accordingly designed for the other light angle of incidence at which the light is incident which is emitted from the light source 57 and is coupled via the light coupling device 59 into the light guide 50.

The light now emitted by the light source 56 is coupled via the light coupling device 58 into the light guide 50 and now propagates in the two layers 51 and 52 of the light guide 50 from the left end section to the right end section of the light guide 50, as is apparent in FIG. 6 at the black arrows. The light emitted by the light source 57 is simultaneously coupled via the light coupling device 59 into the light guide 50 and also propagates in the two layers 51 and 52 of the light guide 50. This coupled-in light now propagates due to the arrangement of the light source 57 on the other side of the light guide 50 in the opposite direction to the light which is coupled via the light coupling device 58 into the light guide 50. That is to say, the light coupled via the light coupling device 59 into the light guide 50 now propagates from the right end section to the left end section of the light guide 50, as shown by the dotted arrows in the light guide 50 of FIG. 6. Both light bundles are again incident during the propagation on the beam splitter element 53, which splits the light into reflected and transmitted parts, which propagate further in the layers 51 and 52 as explained with reference to FIGS. 4 and 5. A defined light component of the propagating light is transmitted upon each incidence on the partially-reflective layer 55 and coupled out of the light guide 50 of the light guiding device by means of the diffractive optical element provided for this purpose of the light decoupling device 54. The decoupled intensity of the light coupled in via the light coupling device 58 and thus the brightness of the light is higher in the region of the light coupling device 58 than in the end section of the light guide 50, viewed in the light propagation direction. This also applies to the decoupled intensity of the light coupled in via the light coupling device 59. These two intensity distributions of the light thus propagate in the light guide 50 in opposite directions to one another and are then coupled out of the light guide 50 by means of the at least two diffractive optical elements of the light decoupling device 54. The light decoupling device 54 has constant reflectance provided over its surface, so that the two decoupled intensity distributions of the light each have a gradient which are opposite to one another. In this way, the generated inhomogeneous intensity distributions of the light at least partially compensate for one another. The two decoupled intensity distributions have the same intensity profiles, but with opposite gradients, so that the total intensity distribution of the light resulting therefrom represents a constant intensity distribution.

In the light guiding device illustrated in FIG. 6, in which light can be coupled from two sides into the light guide 50, constant decoupling intensity of the light is thus used in order to achieve homogeneous light intensity distribution.

This embodiment of a light guiding device according to FIG. 6 is to represent an alternative to the light guiding device according to FIGS. 3 to 5, which provide a partially-reflective layer having location-dependent transmission and reflection. Since partially-reflective layers having a gradient are usually quite complex and costly to produce, the light guiding device according to FIG. 6 can represent a more cost-effective and simpler alternative.

Figure 7:
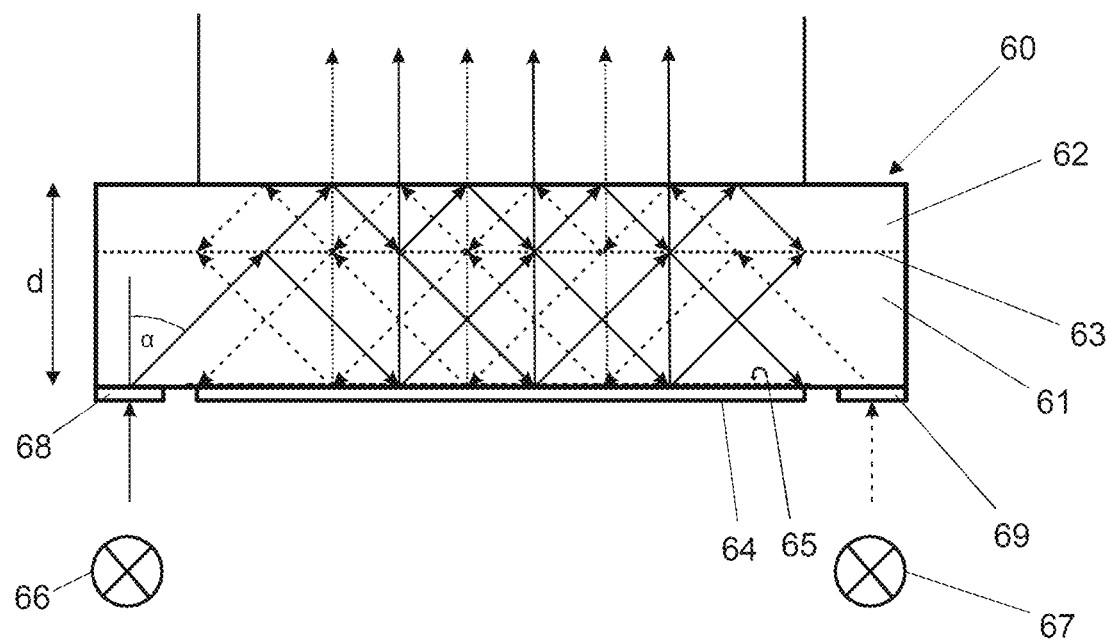
FIG. 7: shows a schematic illustration of a fourth embodiment of the light guiding device according to the invention, where the light guiding device is designed to be reflective.

A further exemplary embodiment of a light guiding device is shown in FIG. 7. In comparison to the light guiding devices of FIGS. 1, 3 to 6, this light guiding device is not designed to be transmissive, but reflective. The structure of the light guiding device according to FIG. 7 fundamentally corresponds here to the structure of the light guiding device according to FIG. 6, but with the exception that another light decoupling device is used. The light guiding device according to FIG. 7 also comprises a light guide 60, which has two layers 61 and 62, between which a beam splitter element 63 is provided, two light coupling devices 68 and 69, on which light is incident from two light sources 66 and 67 and can be coupled into the light guide 60, a light decoupling device 64, and a partially-reflective layer 65 between the light guide 60 and the light decoupling device. However, the light decoupling device 64 does not have diffractive optical elements designed to be transmissive here, but diffractive optical elements designed to be reflective, for example volume gratings.

The coupling of the light into the light guide 60, the propagation of the light in the light guide 60, and the coupling of the light out of the light guide 60 take place as described for FIG. 6. However, since the light decoupling device 64 is designed to be reflective and thus operates reflectively, the light let through or transmitted by the partially-reflective layer 65 is now incident on the light decoupling device 64, in particular on the at least two diffractive optical elements, in such a way that this light, which propagates in each of two opposing sides of the light guide 60, is not transmitted but reflected by the light decoupling device 64, i.e., by the at least two diffractive optical elements, as shown in FIG. 7. The light reflected by the light decoupling device 64 now passes through the two layers 61 and 62 of the light guide 60 and exits from the light guide 60 on the opposite side to the side of the light decoupling device 64, as shown by the arrows in FIG. 7.

A high homogeneity and efficiency of the decoupled light can also be achieved in this way for a reflective light guiding device.

A reflective light guiding device can of course also be embodied having only one light source. In this case, however, a partially-reflective layer is to be used which has location-dependent transmission and reflection, thus has a gradient, so that high homogeneity and high efficiency are achieved for the decoupled light.

Figure 8:
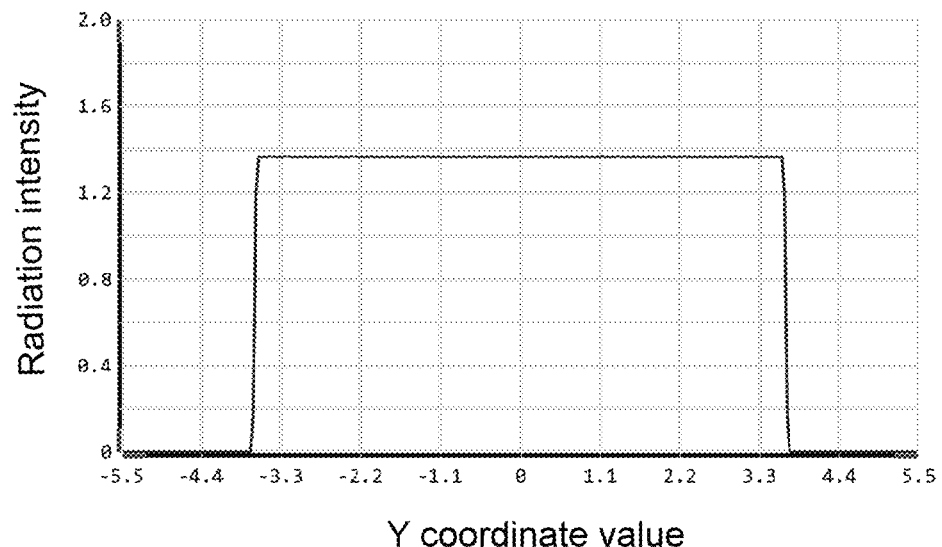
FIG. 8: shows a representation in a graph of a light intensity distribution coupled into the light guiding device according to the invention and a light intensity distribution coupled out of the light guiding device.
Figure 8:
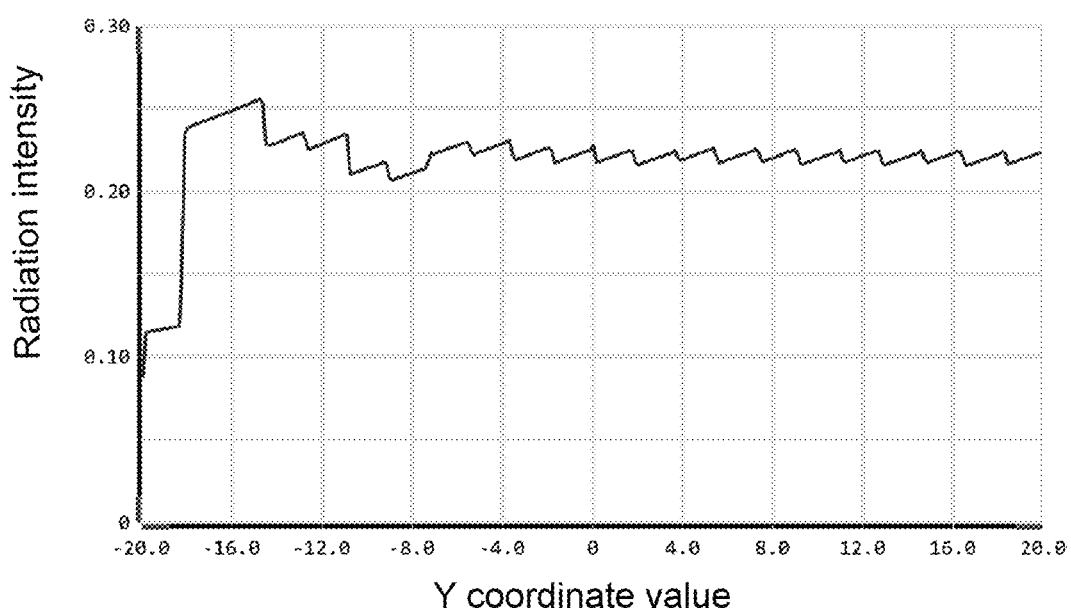
Figure 9:
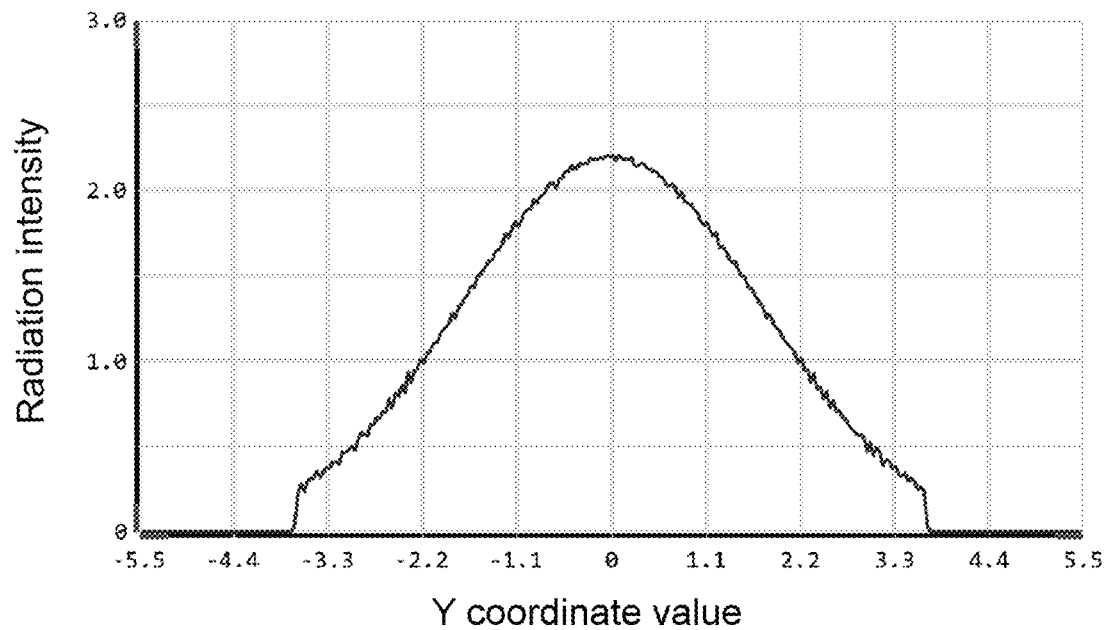
FIG. 9: shows a representation in a graph of a further light intensity distribution coupled into the light guiding device according to the invention and a further light intensity distribution coupled out of the light guiding device.
Figure 9:
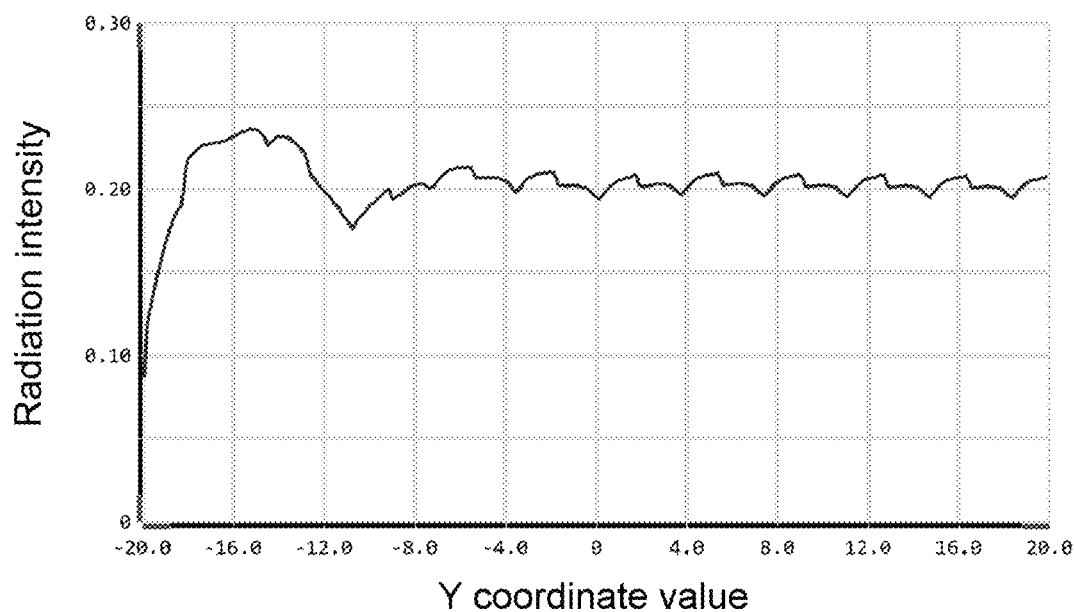

In following FIGS. 8 and 9, two examples of a light intensity distribution to be coupled into the light guide of a light guiding apparatus according to the invention are shown, which are preferably applicable in order to optimize the homogeneity and efficiency of the light to be coupled out. The light guide was only illuminated by one light source here.

FIG. 8 shows, in the upper illustration, a light intensity distribution coupled into the light guide, where the decoupled light intensity resulting therefrom is shown in each case against the coordinate value y in the lower illustration. For this purpose, a light guide of the length L=40 mm and the layer thicknesses d1=1.333 mm and d2=0.667 mm was used. The light propagation angle in the light guide was α=70°, where the reflection-transmission ratio of a beam splitter element arranged in the light guide is 38.197% to 61.803%. A light intensity distribution having a rectangular profile can preferably be used for the light coupling into the light guide, as shown in the upper illustration of FIG. 8. The rectangular input profile has a width of 7.32 mm, where half the width of the input profile is thus 3.66 mm. This rectangular input profile of the light generates a decoupled light intensity having a wavy or zigzag profile of the output intensity of the light, as shown in the lower illustration of FIG. 8. This wavy or zigzag profile of the output intensity of the light results from the rising or increasing transmission of a partially-reflective layer provided in the light guiding device during the propagation of the light in the light guide. The waves or zags of the rectangular profile have a period of 1.8 mm.

In order to compensate for the increasing output efficiency of the light of the partially-reflective layer, i.e., also the waves or zags, in this case and thus increase the homogeneity of the light, the input profile of the light can have a location-dependent intensity distribution. This can be produced, for example, via a profile of the light intensity distribution to be coupled in which has a gradient. A gradient could be generated, for example, by means of a linear gradient gray filter or also by means of a diffractive optical element which is formed for a corresponding redistribution of the light. The nearly triangular waves or zags of the profile of the output intensity of the light are converted by the application of a gradient in the profile of the coupled-in light intensity distribution into rectangular waves or zags. In the above exemplary embodiment, half the period of the waves or zags would then be approximately 1.8 mm.

A further exemplary embodiment of a preferred profile of a light intensity distribution to be coupled into a light guide of a light guiding device is shown in FIG. 9. The input intensity distribution of the light is also again shown here in the upper illustration and the output intensity of the light resulting therefrom is shown in the lower illustration. A light intensity distribution having a Gaussian profile is used here for the light coupling into the light guide. The parameters of the light guide, the propagation angle of the light in the light guide, and the beam splitter element correspond to the parameters for the described rectangular profile according to FIG. 8. A partially-reflective layer having a location-dependent transmission and reflection is again used here. Half the width of the input profile of the light according to the above illustration in FIG. 9 is 3.66 mm having a $1/e^2$ radius of 3.5 mm. As can be seen in the lower illustration of FIG. 9, waves or zags also remain in the profile of the output intensity of the light with a Gaussian profile of the light intensity distribution coupled into the light guide. However, the output intensity of the light appears more uniform or fluid in the transitions between the individual decoupled light segments in the case of a coupled-in light intensity distribution having a Gaussian profile than in the case of a light intensity distribution having a rectangular profile, where the differences in the output intensity of the light are only minimal, however. Moreover, there is a slightly higher light intensity here in the region of the light coupling as with a rectangular profile to be coupled according to the lower illustration of FIG. 8, since in this region the light, which propagates in the two layers of the light guide, is only still indirectly mixed with one another. However, the output intensity of the light in the further regions of the light guide is sufficiently constant, so that high homogeneity and high efficiency of the decoupled light can be achieved. The homogeneity of the decoupled light can thus also be improved using a Gaussian profile of the light intensity distribution to be coupled in.

A sawtooth profile of the light intensity distribution to be coupled in can also be applied in order to increase the homogeneity of the light to be coupled out of the light guide. Of course, other types of profile, for example a triangular profile, can also be used for the light intensity distribution to be coupled in.

These profile types mentioned and described here of the light intensity distribution to be coupled in can also be applied in conjunction with a light guiding device which uses two light sources at two different locations of the light guide in order to couple light into the light guide, as shown in FIGS. 6 and 7, for example.

Figure 10:
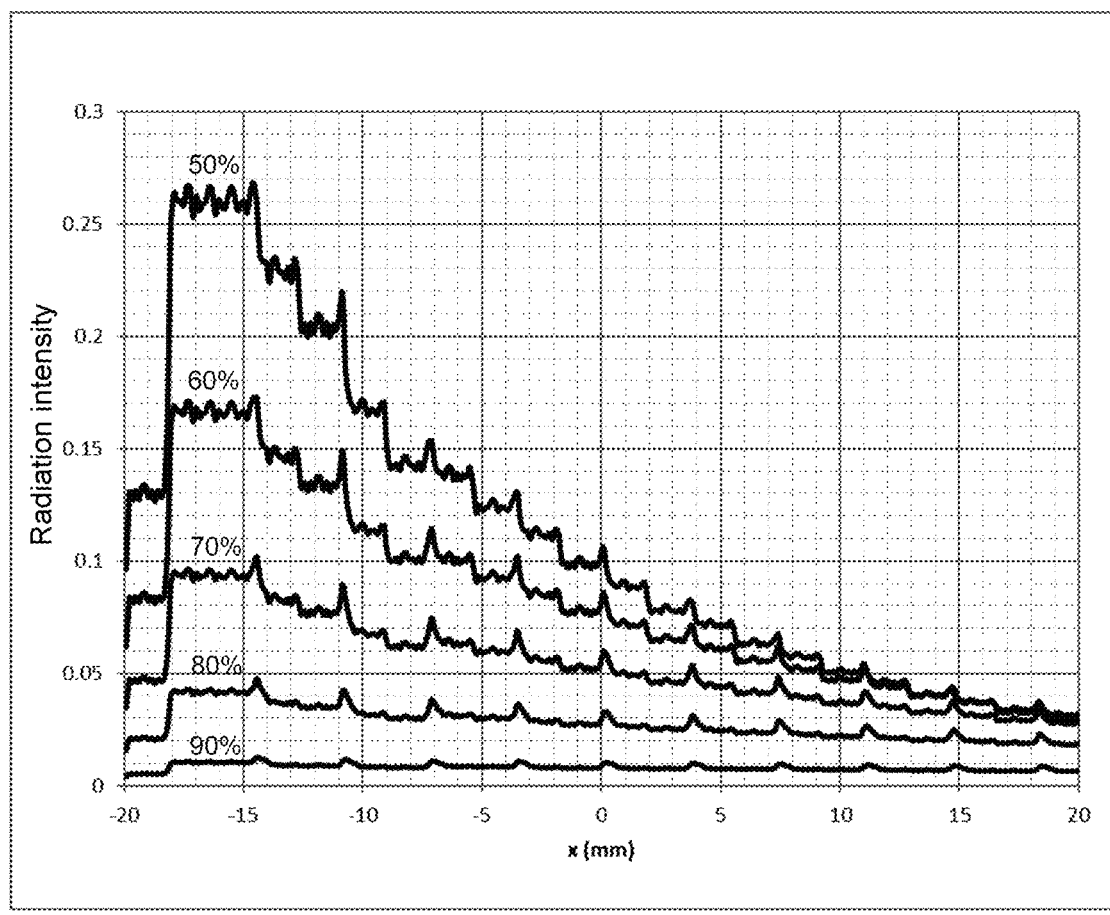
FIG. 10: shows a representation in a graph of the light intensity of a light intensity distribution coupled out of a light guiding device according to the invention, where the light guiding device is illuminated from one side.
Figure 11:
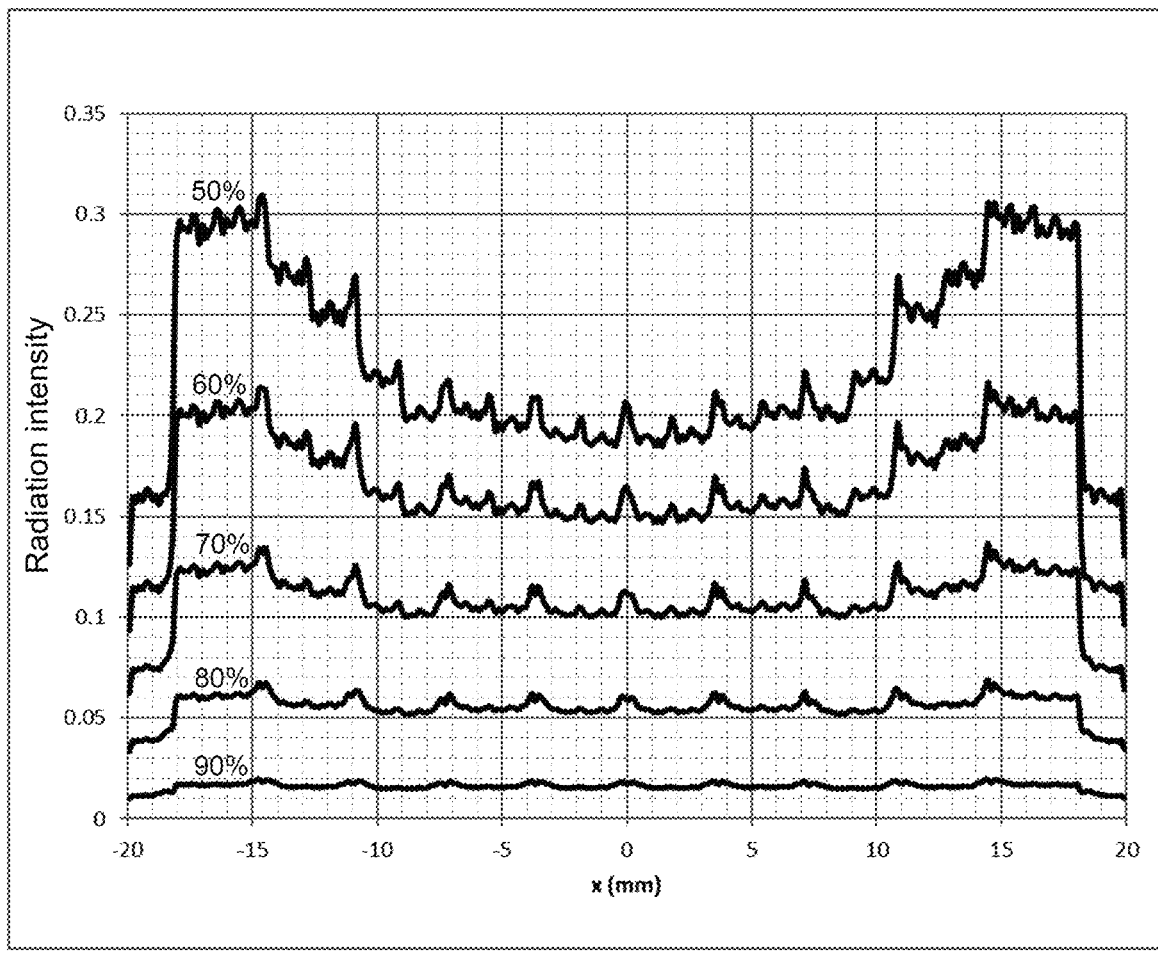
FIG. 11: shows a representation in a graph of the light intensity of a light intensity distribution coupled out of a light guiding device according to the invention, where the light guiding device is illuminated from two sides.

Two exemplary embodiments of an output intensity of the light are shown in FIGS. 10 and 11, which were obtained by simulations in which the reflectivity of the partially-reflective layer in the light guiding device was varied and its effect on the decoupled light intensity was studied. For this purpose, a light guide having two layers, the thicknesses of which are d1=1.33 mm and d2=0.67 mm, so that a total thickness of the light guide of d=2 mm is present, a light decoupling device of the length L=36 mm, and a light propagation angle α=70° were used. The beam splitter element is thus arranged 1.33 mm from the boundary surface of the light guide which is formed by the layer having the thickness d1, where this beam splitter element has a reflectivity of approximately 38%.

In FIG. 10, the output intensity of the light is shown against the parameter x for a coupled-in light intensity distribution having a rectangular profile for various values of the reflectivity of the partially-reflective layer. Half the width of the input profile of the light intensity distribution is 3.66 mm here. The light is only coupled from one side into a light guide of a light guiding device according to the invention, as shown in FIGS. 4 and 5, for example, from which the illustrated output intensities of the light result. In this case, reflectivities of 50%, 60%, 70%, 80%, and 90% were used for the partially-reflective layer. Upon observation of the individual output intensities of the light for all reflectances or reflectivity values shown of the partially-reflective layer, it can be seen that if the light is coupled into the light guide from only one side, the output light intensity is inhomogeneous over the surface of the light decoupling device or the light guide. As can be seen from FIG. 10, the light intensity is high in the region of the light coupling, where the decoupled light intensity in an opposing end section of the light guide is very low. This applies for every reflectivity shown of the partially-reflective layer. The output intensity of the light is therefore not constant over the surface of the light decoupling device of the light guiding device, whereby sufficiently homogeneous light intensity distribution is not provided after the coupling of the light out of the light guide. In order to avoid or prevent such inhomogeneity of the decoupled light, the partially-reflective layer can be provided with a gradient. This means the partially-reflective layer is to be designed in such a way that it has location-dependent transmission and reflection.

A constant output intensity of the light without the use of a partially-reflective layer having a location-dependent transmission and reflection may be achieved in that the light guide of the light guiding device is illuminated using two light sources. This means that the light guide is illuminated via a first light source from a first side and via a second light source from a second side, as shown in FIGS. 6 and 7. In this case, the light propagates in opposite directions to one another in each case, so that two light intensity distributions are coupled out similarly as in FIG. 10. The two light intensity distributions are then superimposed to form a light intensity distribution having a nearly constant intensity over the surface of the light decoupling from the light guide.

Such an output intensity of the light is shown against the parameter x for a coupled-in light intensity distribution having a rectangular profile for various values of the reflectivity of the partially-reflective layer in FIG. 11. Half the width of the input profile of the light intensity distribution is again 3.66 mm here. As already mentioned, the light is now coupled here from two sides into the light guide of a light guiding device according to the invention, from which the illustrated output intensities of the light result. For the partially-reflective layer, reflectivities of 50%, 60%, 70%, 80%, and 90% were again used here. As is apparent, the two light bundles propagating in opposite directions to one another in the light guide result in each case in accordance with the illustrated reflectivity of the partially-reflective layer in light intensity distributions which are superimposed to form a total intensity distribution of the light, which has a significantly better homogeneity than the output intensity of the light according to FIG. 10. This means that the homogeneity of the decoupled light is increased when light is coupled from two sides into the light guide of the light guiding device.

In order to further improve the homogeneity of the light coupled out of the light guiding device by avoiding the trough shape of the total intensity distributions generated and shown according to FIG. 11, the partially-reflective layer can have location-dependent reflection and transmission, i.e., can be formed as a gradient layer.

Generally considered, different parameters of the light guiding device influence the homogeneity of the output intensity of the light. These parameters can thus be used to optimize and improve the overall light guiding device. The parameters of the light guiding device which can be optimized and which influence the size and position of the decoupled light segments and also the decoupled intensity distribution of the light include:

the thickness of the light guide or the thickness of the individual layers of the light guide the profile of the light intensity distribution to be coupled in the propagation angle of the light in the light guide the length of the light decoupling device the arrangement of the at least one beam splitter element in the light guide, i.e., the distance of the at least one beam splitter element from the boundary surfaces of the light guide the reflectivity of the beam splitter element the reflectivity or the transmission profile of the partially-reflective layer, where the reflectivity can be spatially constant or also dependent on the coordinates of the light guide, for example, according to a gradient layer.

For example, the thicknesses of the layers of the light guide can be optimized in such a way that decoupled light segments, which are coupled out of the layer having the thickness d2, as precisely as possible fill the gap or the space between the light segments which are coupled out of the layer having the thickness d1, so that there is an overlap of the individual light segments. The thickness d1 is to be twice the thickness d2 here. This is because a light beam which executes an additional reflection in the layer having the thickness d2 strikes the light decoupling device essentially precisely between two light decoupling positions of a light beam which only propagates in the layer having the thickness d1. Of course, the thicknesses d1 and d2 of the two layers of the light guide can also have other dimensions.

The intensities of the individual decoupled light segments are also to correspond or match with one another. The reflectivity of the at least one beam splitter element plays an important role in this case. The reflectivity of the beam splitter element is to be identified here with R. A light beam having incident power P, which is reflected once by the beam splitter element and is incident on the light decoupling device, has the power P·R. A light beam which is transmitted by the beam splitter element, then reflected in total internal reflection and transmitted again by the beam splitter element has the power $P\cdot(1-R)^2$. Both powers are equal if the following condition is met:

$$R = \tfrac{1}{2}(3-\sqrt{5}) = 0.38197 = 38.197\%.$$

The reflectivity of approximately 38% has proven to be particularly advantageous, since then the two intensities of the light distributions are equal and thus a high homogeneity can be ensured. However, the invention is not to be restricted to a reflectivity of approximately 38%.

Furthermore, the light guiding device can also comprise multiple beam splitter elements, i.e., at least two beam splitter elements, so that a light guide of the light guiding device has multiple layers, i.e., at least three layers. This applies both to a light guiding device in which the light is coupled into the light guide from only one side and also to a light guiding device in which the light is coupled into the light guide from two sides. The light propagating in the at least three layers of the light guide is coupled with one another via the at least two beam splitter elements and thus mixed. The homogeneity of the decoupled light intensity can be further improved by the use of more than one beam splitter element in the light guide.

Moreover, the partially-reflective layer can be integrated into the light decoupling device.

In further embodiments of a light guiding device, the light decoupling device can also comprise at least one diffractive optical element, for example, a volume grating, which provides a diffraction efficiency of $\eta < 100\%$ or has a gradient in the diffraction efficiency. For both embodiments of the light decoupling device, the light guiding device does not require a partially-reflective layer. The function of the partial reflection and transmission of the light is then taken over by the at least one diffractive optical element of the light decoupling device. The light decoupling device is therefore designed in such a way that parts of the incident light are reflected and propagate further in the light guide and the remaining parts of the light are deflected and coupled out of the light guide.

Furthermore, a light guide of the light guiding device according to the invention can comprise one mirror element or also multiple mirror elements on at least one lateral surface. That is to say, at least one mirror element can be provided on a lateral surface of the light guide present in the light propagation direction. It is also possible that both lateral surfaces, from and/or to which the light propagates in the light guide, comprise one mirror element or also multiple mirror elements. This or these mirror element(s) is/are provided for reflection of the light not coupled out of the light guide, so that the reflected light can propagate further in the light guide and be coupled out. In this way, the efficiency of the light guiding device and the intensity of the decoupled light can be increased.

A light guiding device according to the invention is usable in an illumination device in order, for example, to uniformly illuminate at least one spatial light modulation device. Such an illumination device having at least one light guiding device is shown in FIG. 12.

The illumination device comprises at least one light source 80, which emits light that is incident on a downstream collimation unit 81. The collimation unit 81 collimates the light emitted and incident from the at least one light source 80. This collimated light is then incident on the light guiding device 82 arranged downstream, into which the light can be coupled. The light guiding device 82 can be designed here according to FIGS. 1 to 7 and can be further optimized according to FIGS. 8 to 11. The light guiding device 82 is provided for the most uniform and homogeneous possible illumination of a device or element 83 downstream of the illumination device. The device or the element 82 could be, for example, at least one spatial light modulation device or also another element which requires uniform and homogeneous illumination. The illumination device having the light guiding device 82 according to the invention can also have other elements or components, for example lenses, in addition to a collimation unit, of course.

Such an illumination device can be used in particular in display devices for two-dimensional and/or three-dimensional display of information, such as objects or scenes. Such a display device can be, for example, a head-up display, a direct view display, or also a head-mounted display or a projection device. For illustration, such an illumination device is now to be described with reference to a head-up display and its functionality. Of course, such illumination devices having a light guiding device according to the invention are also particularly advantageously usable in direct view displays, which have spatial light modulation devices that are relatively large (for example an edge length of at least 10 cm) in their size, since the cross section of the overall light coupled into the light guiding device can be significantly enlarged using the light guiding device, with compact design at the same time.

Figure 12:
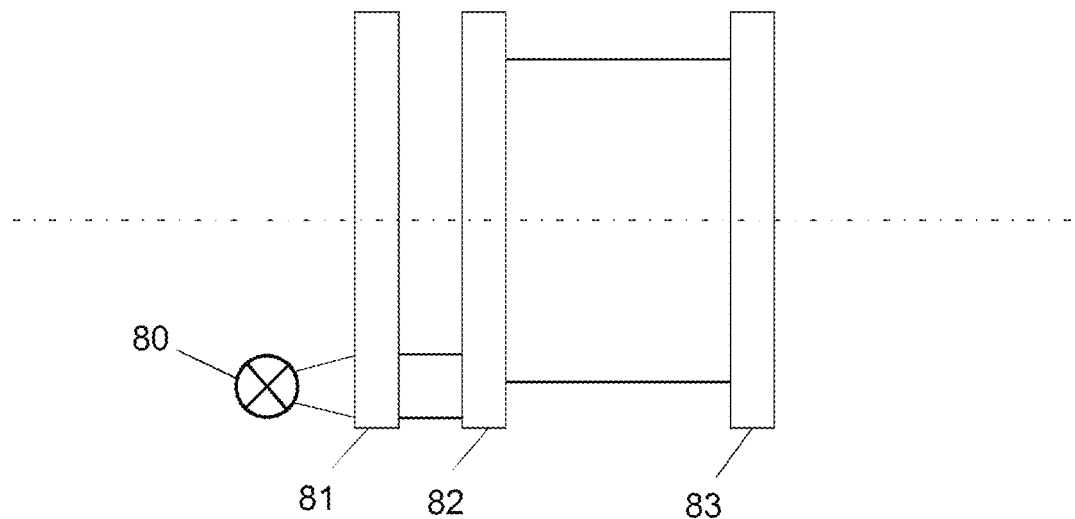
FIG. 12: shows a schematic illustration of an illumination device according to the invention.
Figure 13:
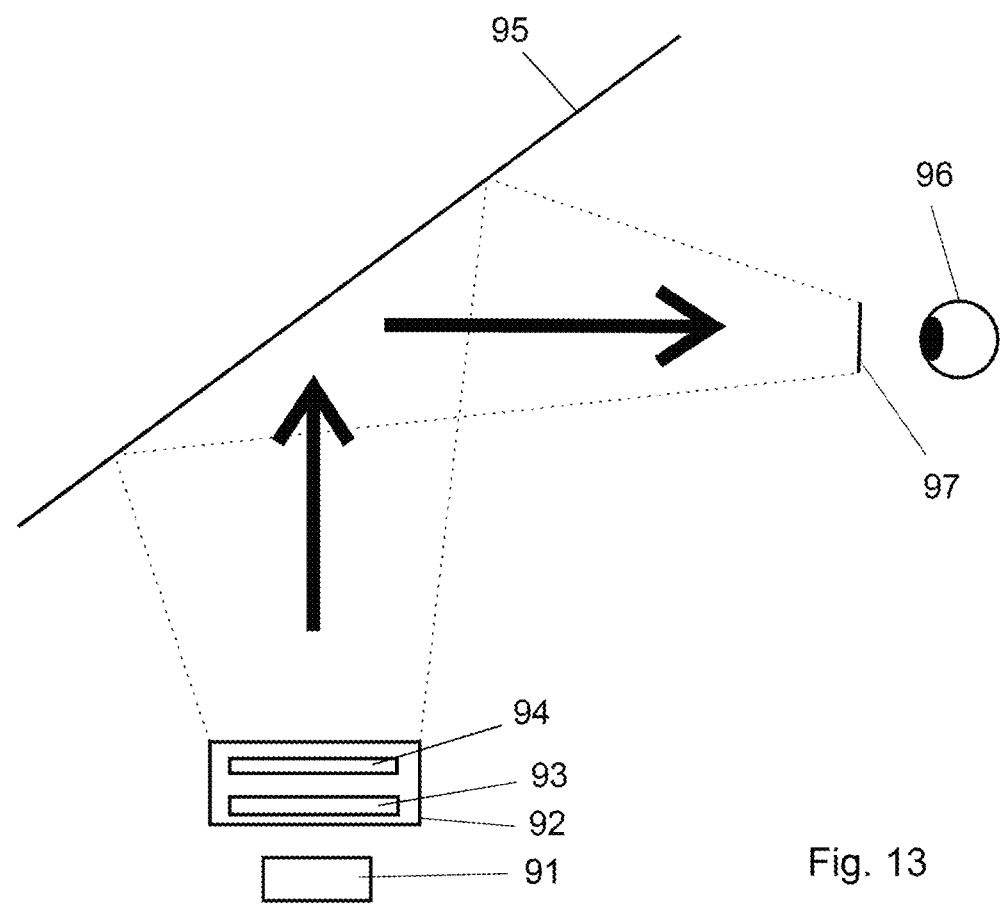
FIG. 13: shows a schematic illustration of a display device according to the invention having an illumination device according to FIG. 12.

A head-up display is shown by way of example in FIG. 13, which comprises an illumination device according to FIG. 12. Head-up displays are preferably used in transportation means, for example in motor vehicles or aircraft, in order to project or overlay information in the form of image information directly into the field of view for the operator or vehicle driver. The head-up display, which is provided in an interior of a motor vehicle or an aircraft and projects light, comprises an illumination device 91 according to FIG. 12, which comprises at least one light source, a collimation unit, and at least one light guiding device. The illumination device 91 is followed in the light propagation direction by a projection device 92, which comprises at least one spatial light modulation device 93 and an optical system 94, which contains imaging elements, for example lenses. The optical system 94 is not shown in greater detail here for reasons of clarity. The at least one spatial light modulation device 93 modulates the light emitted by the illumination device 91 in accordance with an information to be generated, which is displayed on the at least one spatial light modulation device 93. The light emitted by the projection device 92 is projected on a deflection device 95, which is used as a projection surface, so that the image of the at least one spatial light modulation device 93 is displayed as virtual information to an observer 96, who is located in the motor vehicle or in the aircraft and is represented here by an eye. The deflection device 95 comprises at least one deflection element and is part of the optical system of the head-up display here and is formed partially reflective. The information can be generated two-dimensionally in a known way and displayed in a field of view of the observer 96. The observer 96 can then observe the displayed information through a visibility region 97. The at least one deflection element of the deflection device 95 is formed here as the windshield of the motor vehicle or aircraft.

However, a hologram can also be encoded into the at least one spatial light modulation device 93 in order to generate the information to be displayed holographically. The illumination device 91 is then to emit sufficient coherent light, for example originating from a laser or an LED (light emitting diode) light source, in order to modulate the incident light in amplitude and phase by means of the hologram encoded in the at least one spatial light modulation device 93 in such a way that the required information can be generated holographically in the field of view of the observer 96. The information can thus be generated and displayed two-dimensionally or also three-dimensionally. A visibility region 97 is generated here in a holographic head-up display. This visibility region 97 is then formed by a Fourier transform of the hologram encoded in the at least one spatial light modulation device 93, however, and can have a size of approximately 2 mm to 15 mm, for example. Since this visibility region 97 only has a limited size, it can be tracked upon movement of the observer 96 to the new position of the observer 96.

In other words, the light exiting from the projection device 92 and represented by the black arrow is reflected on a windshield 95, which is used as a deflection device, in the direction of a visibility region 97. The visibility region 97 is positioned in the region of at least one eye of the observer 96. The correct positioning of the visibility region 97 in relation to the observer can be performed via a corresponding device in the head-up display. The displayed virtual information is overlaid in a spatial region which is spanned by the visibility region 97 up to the windshield 95 and beyond. The windshield 95 is embodied to be light-transmissive, so that the observer 96 can observe the displayed information or the displayed image blended in the environment.

Figure 14:
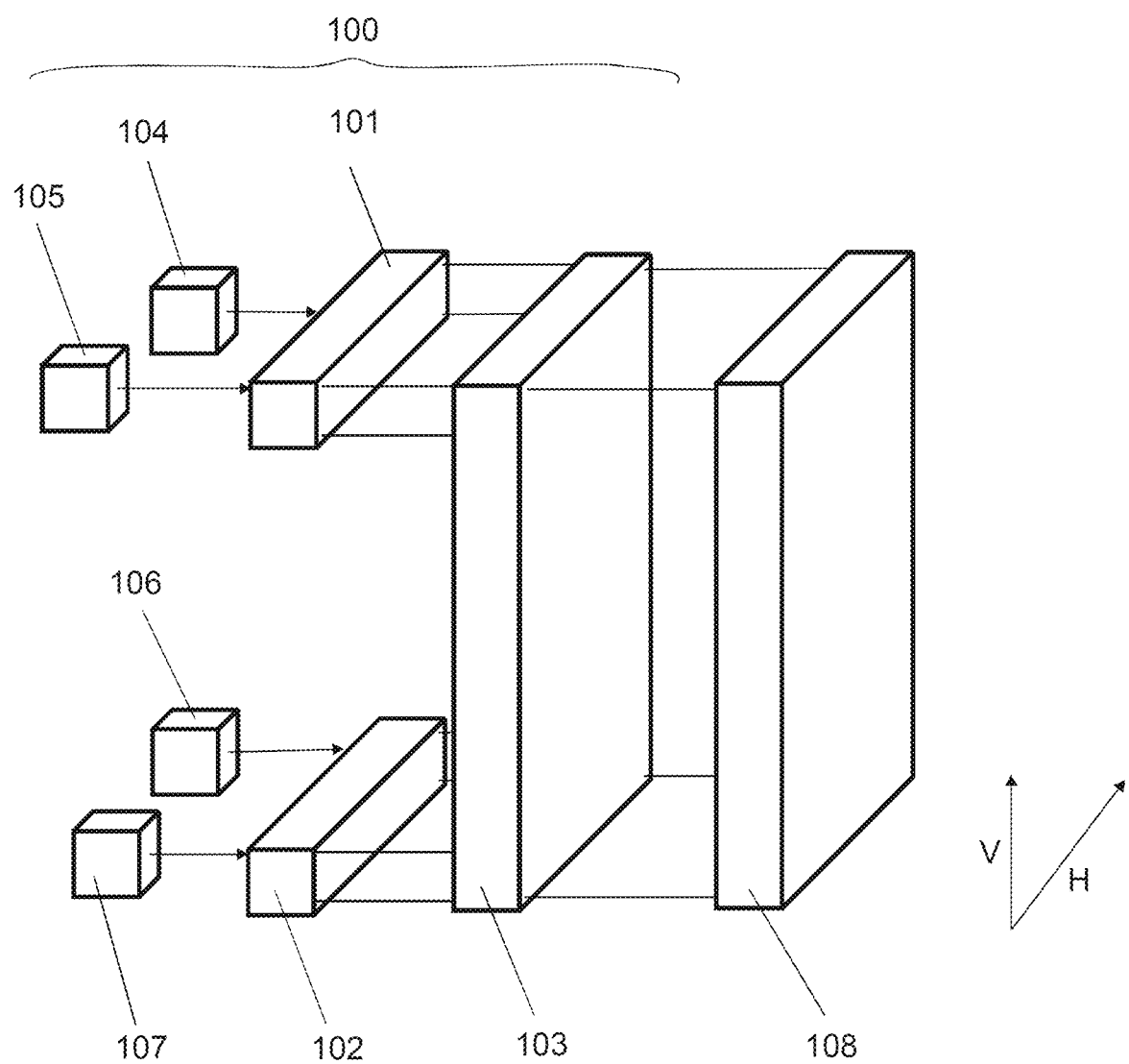
FIG. 14: shows a schematic illustration of a light guiding device, where an expansion of the light in two directions is provided.

The light guiding device according to the invention can also be used to expand the light not only in one direction, but also to expand the light incident thereon in two directions perpendicular to one another. Such a light guiding device can be used particularly advantageously in display devices for displaying information, in which an expansion of the light in the horizontal and vertical directions is required, for example in direct view displays, head-mounted displays, or also in head-up displays according to FIG. 13. An expansion of the light in two directions nearly perpendicular to one another is shown in FIG. 14. To illustrate the expansion of the light by means of the light guiding device, it is shown in conjunction with a spatial light modulation device which can be illuminated in a large area and homogeneously by means of the light guiding device.

A light guiding device 100 now has three light guides 101, 102, and 103 here, which can be designed according to FIGS. 1, 3 to 6. In this case, the two light guides 101 and 102 are formed rod-shaped, while in contrast the light guide 103 is formed planar or cuboidal. As is apparent in FIG. 14, the two light guides 102 and 103 are each arranged in a region of an end section of the planar light guide 103, so that the light coupled out of the respective light guide 101, 102 is incident in a strip shape or one-dimensionally on the planar light guide 103 and is coupled therein. Each light guide 101, 102 is illuminated with light via two light sources 104, 105 and 106, 107, so that the light emitted by the respective light sources 104, 105, 106, 107 is coupled in each case from two sides into the light guide 101, 102. The coupling and decoupling of the light in the light guides 101 and 102 take place here according to the described principle of the light coupling and light decoupling according to FIG. 6. The light then coupled out via the light guides 101 and 102 is expanded according to the light coupled into these light guides 101, 102 in one direction, for example in the horizontal direction H according to the arrow shown. This means that after the coupling of the light out of the light guides 101 and 102, a one-dimensional light intensity distribution is provided in each case, each of which has a high homogeneity and efficiency. These two one-dimensional light intensity distributions are now incident according to FIG. 14 on the planar light guide 103 in each of its end sections and are coupled therein. The coupling and decoupling of the light in the light guide 103 now again take place according to the illustrated and described principle according to FIG. 6. This means that light is coupled into the planar light guide 103 from two sides and propagates in a zigzag shape, advantageously with total internal reflection, therein and is then coupled out of the light guide 103 by means of a light decoupling device. In this way, an expansion of the light in a second direction is achieved, i.e., in a direction perpendicular to the expansion direction of the light which is achieved by means of the light guides 101 and 102. This means that by means of the light guide 103, an expansion of the light can now be achieved here in the vertical direction V according to the arrow shown. A two-dimensional light intensity distribution is now thus present in the light propagation direction after the light guide 103, which furthermore has a high homogeneity and efficiency. This two-dimensional light intensity distribution is now incident on a downstream element, a spatial light modulation device 108 here. The spatial light modulation device 108 can thus be illuminated over a large area by means of the two-dimensional light intensity distribution generated by the light guiding device 100. Of course, other elements can also be two-dimensionally illuminated using the light guiding device 100. For a use of such a light guiding device 100 according to FIG. 14 in a display device, for example in a holographic display device, this light guiding device can be used in an illumination device, which is constructed similarly as shown in FIG. 12. Such an illumination device can again comprise a collimation unit, a light guiding device 100, and of course also further optical elements.

In a simplified embodiment of a light guiding device, using which the light can be expanded in two directions different from one another, for example, in the horizontal and vertical directions, this light guiding device comprises two light guides according to the principle and the described embodiments of FIG. 5. In this case, light is only coupled into the light guide from one side thereof in each case. The structure of such a light guiding device is similar in principle to the structure of the light guiding device according to FIG. 14. However, the light guiding device constructed in a simplified manner for expanding the light in two directions then only still comprises the rod-shaped light guide 101 in conjunction with the light source 104 or 105 for expanding the light in a first direction and the cuboidal light guide 103 for expanding the light in a second direction. This means the second rod-shaped light guide 102 and the light sources 106, 107 and 104 or 105 (depending on which light source is used in conjunction with the light guide 101) are not used in the simplified embodiment of the light guiding device. The principle of the expansion of the light in two different directions corresponds here to the principle described according to FIG. 14.

The invention is not restricted to the exemplary embodiments described here. Moreover, further embodiments or exemplary embodiments are possible. Finally, it is very particularly to be noted that the above-described exemplary embodiments serve only to describe the claimed teaching, but this is not to be restricted to the exemplary embodiments.

The invention claimed is:
1. A light guiding device for guiding light, comprising:
at least one light guide, which has at least two layers,
at least one beam splitter element, which is provided between the at least two layers of the at least one light guide, where the at least one beam splitter element is designed for partially transmitting and reflecting incident light propagating in the at least one light guide, at least one light decoupling device provided at a boundary surface of the at least one light guide for coupling incident light out of the at least one light guide, and a partially-reflective layer, which is arranged between the boundary surface of the at least one light guide and the at least one light decoupling device.

2. The light guiding device as claimed in claim 1, wherein the light propagates within the at least one light guide via a reflection on boundary surfaces of the light guide.

3. The light guiding device as claimed in claim 1, wherein the at least one light guide is formed cuboidal, where the at least one beam splitter element is formed planar and is provided essentially in parallel to the boundary surfaces of the light guide.

4. The light guiding device as claimed in claim 1, wherein the light propagating in the at least two layers of the at least one light guide is coupled to one another via the at least one beam splitter element.

5. The light guiding device as claimed in claim 1, wherein a predetermined ratio of transmission to reflection of the at least one beam splitter element is selected for an essentially homogeneous and efficient decoupling of the light from the at least one light guide.

6. The light guiding device as claimed in claim 1, wherein the at least one light decoupling device comprises at least one diffractive optical element.

7. The light guiding device as claimed in claim 6, wherein the at least one diffractive optical element has a diffraction efficiency of $\eta<100\%$, or the at least one diffractive optical element has a location-dependent diffraction efficiency.

8. The light guiding device as claimed in claim 1, wherein the reflectivity of the partially-reflective layer is optimized with respect to the homogeneity and the efficiency of the light coupled out of the at least one light guide by means of the light decoupling device.

9. The light guiding device as claimed in claim 1, wherein the reflectivity of the partially-reflective layer and the reflectivity of the at least one beam splitter element are adapted to one another.

10. The light guiding device as claimed in claim 1, wherein the partially-reflective layer has a location-dependent transmission and reflection.

11. The light guiding device as claimed in claim 1, wherein the at least one light decoupling device has a constant reflectance provided over its surface.

12. The light guiding device as claimed in claim 1, wherein the at least one light decoupling device is designed to be transmissive or reflective.

13. The light guiding device as claimed in claim 1, wherein at least one mirror element is provided on a lateral surface of the at least one light guide present in the light propagation direction.

14. The light guiding device as claimed in claim 1, wherein a light propagation angle in the at least one light guide is in a range between 60° to 85°.

15. The light guiding device as claimed in claim 1, wherein intensity errors in the light output power which is coupled out of the at least one light guide can be compensated for by means of a location-dependent input intensity distribution of the light which can be coupled into the light guide.

16. The light guiding device as claimed in claim 1, wherein at least one light coupling device is provided, which is arranged on the at least one light guide and is provided for coupling incident light into the light guide.

17. The light guiding device as claimed in claim 16, wherein the light coupling device comprises at least one diffractive optical element or at least one mirror element or at least one prism element.

18. The light guiding device as claimed in claim 1, wherein the profile of the light intensity distribution entering the at least one light guide is a Gaussian profile, a sawtooth profile, or a rectangular profile.

19. The light guiding device as claimed in claim 1, wherein the at least one light decoupling device is designed for decoupling light propagating in the at least one light guide, where at least a portion of the light incident on the at least one light decoupling device is coupled out of the light guide, so that light segments are generatable which can be coupled out of the light guide.

20. The light guiding device as claimed in claim 19, wherein the light segments are arranged continuously adjacent to one another or overlapping one another.

21. The light guiding device as claimed in claim 19, wherein the distance of the individual decoupled light segments from one another is determined by the individual thicknesses of the at least two layers of the at least one light guide.

22. The light guiding device as claimed in claim 1, wherein a width of a light bundle to be coupled into the at least one light guide is determined at the coupling position of the light guide in such a way that homogeneous and efficient coupling of the light out of the light guide is achievable.

23. The light guiding device as claimed in claim 1, wherein the light guiding device is coupled to at least one light source, which emits light and directs it on the light guiding device.

24. The light guiding device as claimed in claim 1, wherein two light sources are coupled to the light guiding device, where the light guiding device is illuminatable by means of a first light source from a first side and the light guiding device is illuminatable by means of a second light source from a second side.

25. The light guiding device as claimed in claim 1, wherein at least two light guides are provided for expanding the light in two directions different from one another.

26. The light guiding device as claimed in claim 25, wherein one light guide is formed rod-shaped and one light guide is formed cuboidal, where the cuboidal light guide is arranged downstream of the rod-shaped light guide in the light propagation direction.

27. An illumination device, comprising:
at least one light source for emitting light, and
a light guiding device as claimed in claim 1, designed for guiding the light emitted by the at least one light source.

28. The illumination device as claimed in claim 27, wherein a collimation unit is provided for collimating the light emitted by the at least one light source.

29. A display device for displaying two-dimensional and/or three-dimensional information, comprising:
at least one illumination device as claimed in claim 28,
at least one spatial light modulation device, which is illuminatable by the illumination device, and
at least one optical system for generating the information to be displayed.

* * * * *